(12) United States Patent
Seo et al.

(10) Patent No.: US 9,877,337 B2
(45) Date of Patent: Jan. 23, 2018

(54) METHOD FOR TRANSMITTING AND RECEIVING SIGNAL USING DEVICE-TO-DEVICE COMMUNICATION IN WIRELESS COMMUNICATION SYSTEM, AND DEVICE FOR SAME

(71) Applicant: LG ELECTRONICS INC., Seoul (KR)

(72) Inventors: Hanbyul Seo, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/772,292

(22) PCT Filed: Mar. 20, 2014

(86) PCT No.: PCT/KR2014/002343
§ 371 (c)(1),
(2) Date: Sep. 2, 2015

(87) PCT Pub. No.: WO2014/148835
PCT Pub. Date: Sep. 25, 2014

(65) Prior Publication Data
US 2016/0037549 A1 Feb. 4, 2016

Related U.S. Application Data

(60) Provisional application No. 61/803,774, filed on Mar. 20, 2013, provisional application No. 61/818,923, (Continued)

(51) Int. Cl.
*H04W 4/00* (2009.01)
*H04W 72/12* (2009.01)
(Continued)

(52) U.S. Cl.
CPC ...... *H04W 72/1242* (2013.01); *H04W 72/121* (2013.01); *H04W 76/023* (2013.01);
(Continued)

(58) Field of Classification Search
CPC .......... H04W 72/1242; H04W 73/023; H04W 72/1247; H04L 5/0048; H04L 5/0069
(Continued)

(56) References Cited

U.S. PATENT DOCUMENTS

2010/0157972 A1 6/2010 Junell
2011/0182280 A1 7/2011 Charbit et al.
(Continued)

FOREIGN PATENT DOCUMENTS

CN 102246575 A 11/2011
CN 102265550 A 11/2011
(Continued)

OTHER PUBLICATIONS

CATT, "On Evaluation Methodology and Channel Model for D2D Proximity Services," 3GPP TSG RAN WG1 Meeting #72, R1-130061, St Julian's, Malta, Jan. 28-Feb. 1, 2013, pp. 1-4.
(Continued)

*Primary Examiner* — Faisal Choudhury
(74) *Attorney, Agent, or Firm* — Birch, Stewart, Kolasch & Birch, LLP

(57) ABSTRACT

Disclosed is a method by which a representative terminal of a specific cluster performs scheduling for device-to-device (D2D) communication in a wireless communication system. Particularly, the method comprises the steps of: receiving a first signal from a terminal of a neighboring cluster; and comparing a priority given to the neighboring cluster with a priority given to the specific cluster in a specific resource among a plurality of resources so as to perform D2D communication scheduling on a component terminal of the
(Continued)

specific cluster, wherein the first signal includes information on the neighboring cluster.

10 Claims, 22 Drawing Sheets

Related U.S. Application Data filed on May 3, 2013, provisional application No. 61/829,272, filed on May 31, 2013, provisional application No. 61/847,554, filed on Jul. 17, 2013, provisional application No. 61/874,343, filed on Sep. 5, 2013, provisional application No. 61/914,348, filed on Dec. 10, 2013.

(51) Int. Cl.
*H04W 76/02* (2009.01)
*H04L 5/00* (2006.01)

(52) U.S. Cl.
CPC .......... *H04L 5/0048* (2013.01); *H04L 5/0069* (2013.01); *H04W 72/1247* (2013.01)

(58) Field of Classification Search
USPC ........................................................ 370/329
See application file for complete search history.

(56) References Cited

U.S. PATENT DOCUMENTS

| | | | |
|---|---|---|---|
| 2011/0268004 A1 | 11/2011 | Doppler et al. | |
| 2012/0083283 A1 | 4/2012 | Phan et al. | |
| 2012/0163278 A1* | 6/2012 | Chang | H04L 12/189 370/312 |
| 2012/0243431 A1 | 9/2012 | Chen et al. | |
| 2013/0316727 A1* | 11/2013 | Edge | H04W 4/02 455/456.1 |
| 2014/0064263 A1* | 3/2014 | Cheng | H04W 8/005 370/350 |
| 2014/0099950 A1* | 4/2014 | Mildh | H04W 56/001 455/434 |
| 2014/0140222 A1* | 5/2014 | Jiang | H04W 76/021 370/252 |
| 2014/0153390 A1* | 6/2014 | Ishii | H04W 76/023 370/230 |
| 2015/0319724 A1* | 11/2015 | Chae | H04W 8/005 370/315 |

FOREIGN PATENT DOCUMENTS

| | | |
|---|---|---|
| WO | WO 2010/109303 A2 | 9/2010 |
| WO | WO 2010/116220 A1 | 10/2010 |

OTHER PUBLICATIONS

General Dynamics Broadband, "Evaluation Methodology for Proximity Services," 3GPP TSG RAN WG1#72, R1-130377, St Julian's, Malta, Jan. 28-Feb. 1, 2013, pp. 1-13.

* cited by examiner

FIG. 2
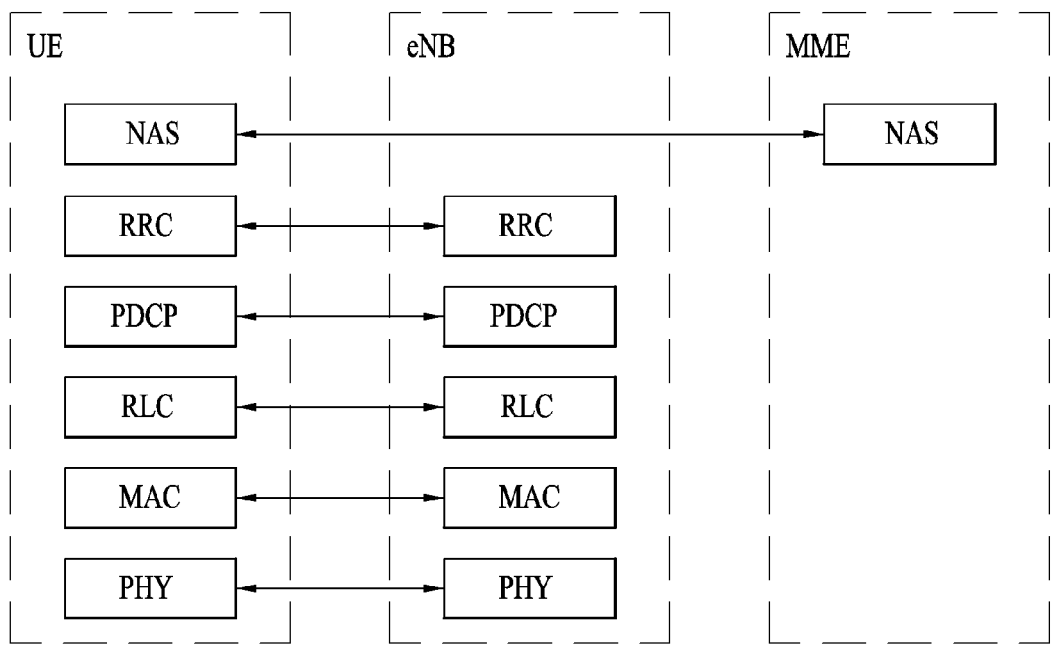
(a) CONTROL-PLANE PROTOCOL STACK
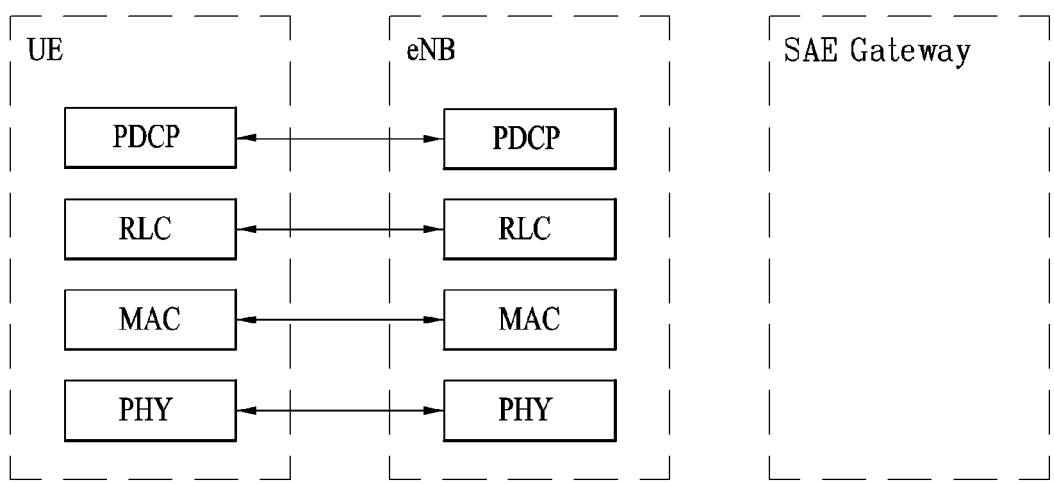
(b) USER-PLACE PROTOCOL STACK

METHOD FOR TRANSMITTING AND RECEIVING SIGNAL USING DEVICE-TO-DEVICE COMMUNICATION IN WIRELESS COMMUNICATION SYSTEM, AND DEVICE FOR SAME

CROSS REFERENCE TO RELATED APPLICATIONS

This application is the National Phase of PCT International Application No. PCT/KR2014/002343, filed on Mar. 20, 2014, which claims priority under 35 U.S.C. 119(e) to U.S. Provisional Application Nos. 61/803,774 filed on Mar. 20, 2013, 61/818,923 filed on May 3, 2013, 61/829,272 filed on May 31, 2013, 61/847,554 filed on Jul. 17, 2013, 61/874, 343 filed on Sep. 5, 2013 and 61/914,348 filed on Dec. 10, 2013, all of which are hereby expressly incorporated by reference into the present application.

TECHNICAL FIELD

The present invention relates to a wireless communication system and, more particularly, to a method of transmitting and receiving a signal using direct communication between terminals in a wireless communication system, and an apparatus for the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method of transmitting and receiving a signal using direct communication between terminals in a wireless communication system, and an apparatus for the same.

Technical Solution

The object of the present invention can be achieved by providing a method of performing scheduling for device-to-device (D2D) communication by a representative user equipment (UE) of a particular cluster in a wireless communication system, including receiving a first signal from a UE of an adjacent cluster, and performing D2D communication scheduling for a UE included in the particular cluster by comparing a priority assigned to the adjacent cluster with a priority assigned to the particular cluster in a particular resource among a plurality of resources, wherein the first signal includes information about the adjacent cluster. Here, the performing may include transmitting a second signal including scheduling information of the included UE.

Preferably, the performing may include performing D2D communication scheduling only for a UE located within a predetermined distance from the representative UE when the priority assigned to the adjacent cluster is greater than the priority assigned to the particular cluster. Alternatively, the performing may include performing scheduling for reducing D2D transmission power with respect to the included UE when the priority assigned to the adjacent cluster is greater than the priority assigned to the particular cluster.

More preferably, the priority assigned to the adjacent cluster and the priority assigned to the particular cluster may be determined based on a cluster identifier, and varied based on respective indices of a plurality of resources.

Meanwhile, the method may further include transmitting a synchronization signal to the included UE, wherein the synchronization signal transmitted to the included UE is separated from a synchronization signal transmitted by a representative UE of the adjacent cluster by a predetermined time interval.

In addition, the receiving may be performed using a predetermined multiple of the plurality of resources as a unit.

Additionally, the method may further include allocating at least one resource associated with the particular resource among the plurality of resources to the included UE.

Advantageous Effects

According to embodiments of the present invention, it is possible to perform direct communication between terminals while efficiently mitigating interference in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE

Figure 1:
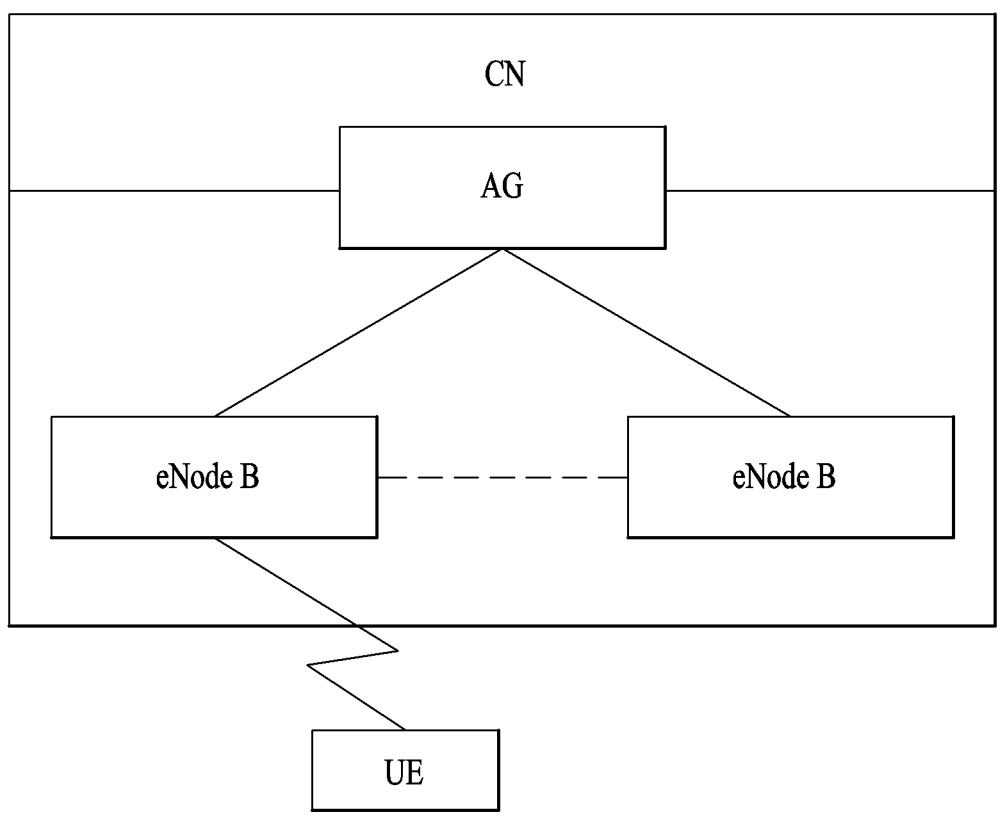
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
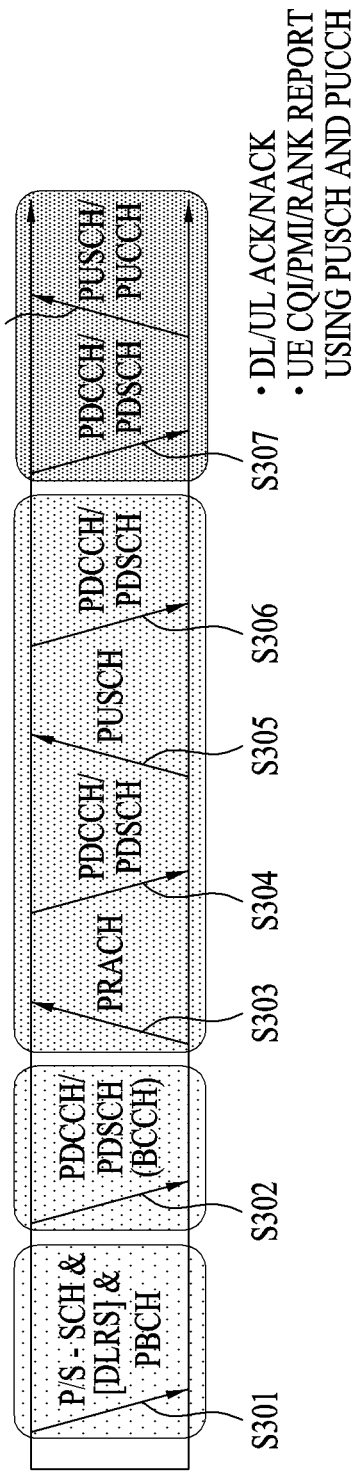
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
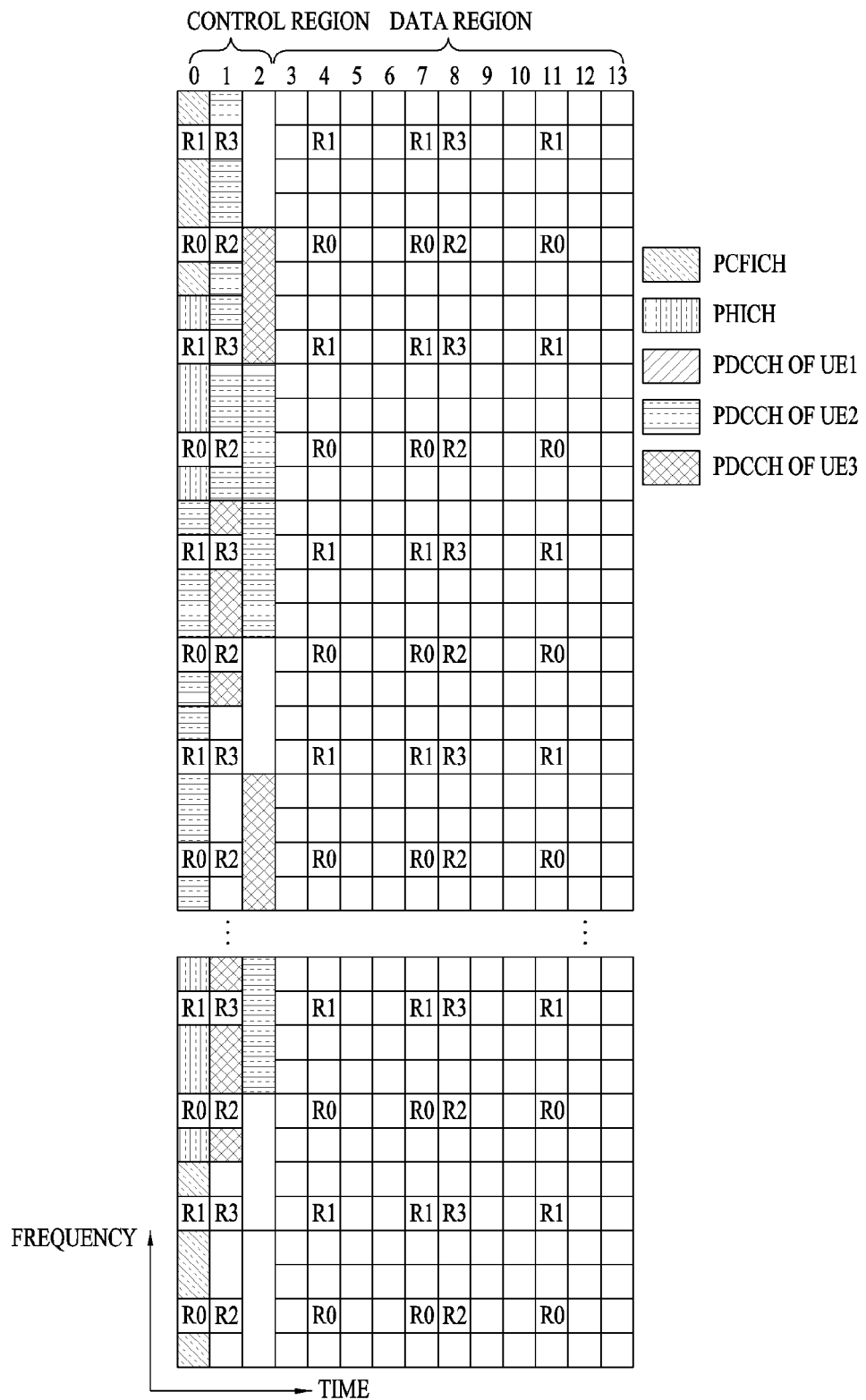
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
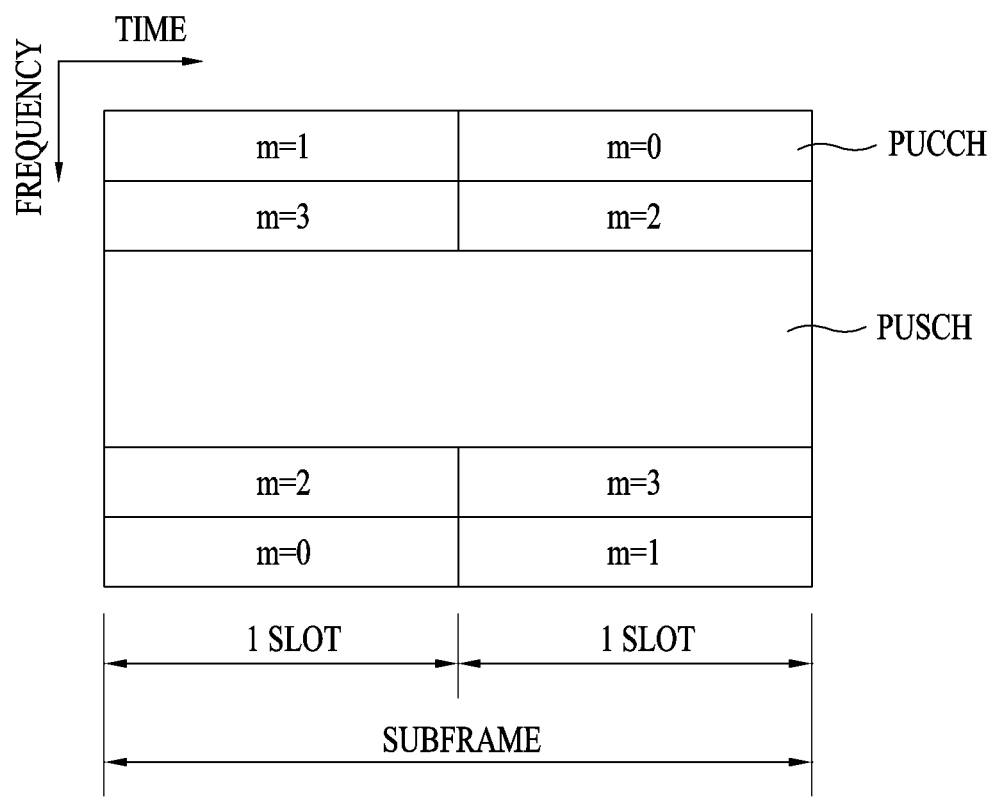
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid- ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
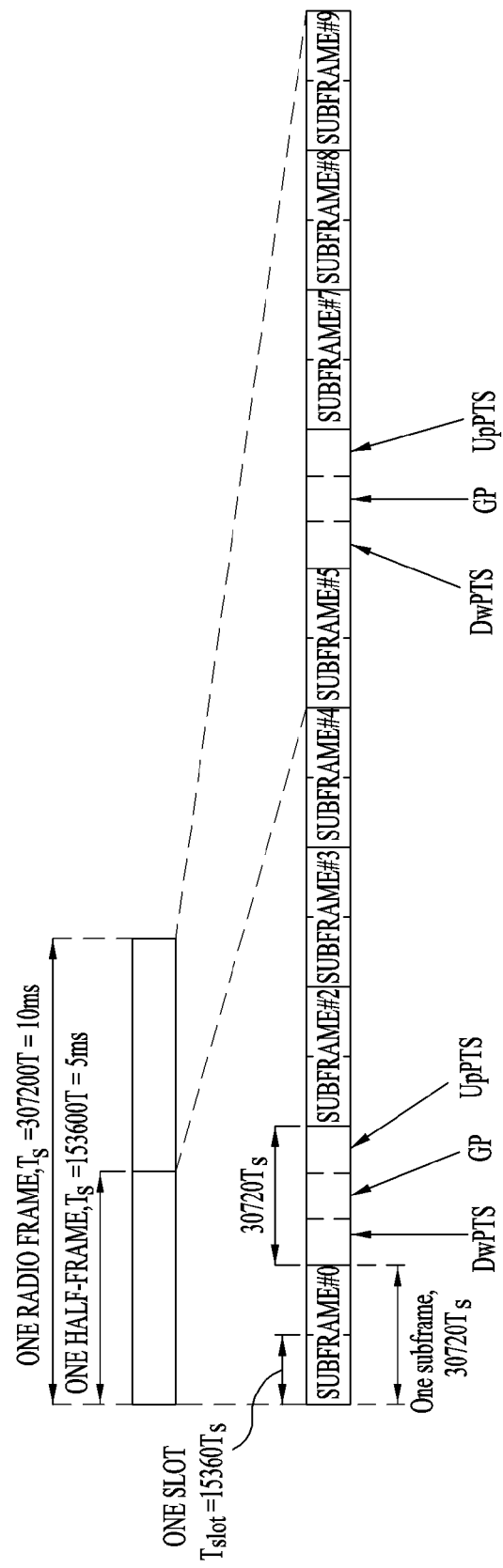
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
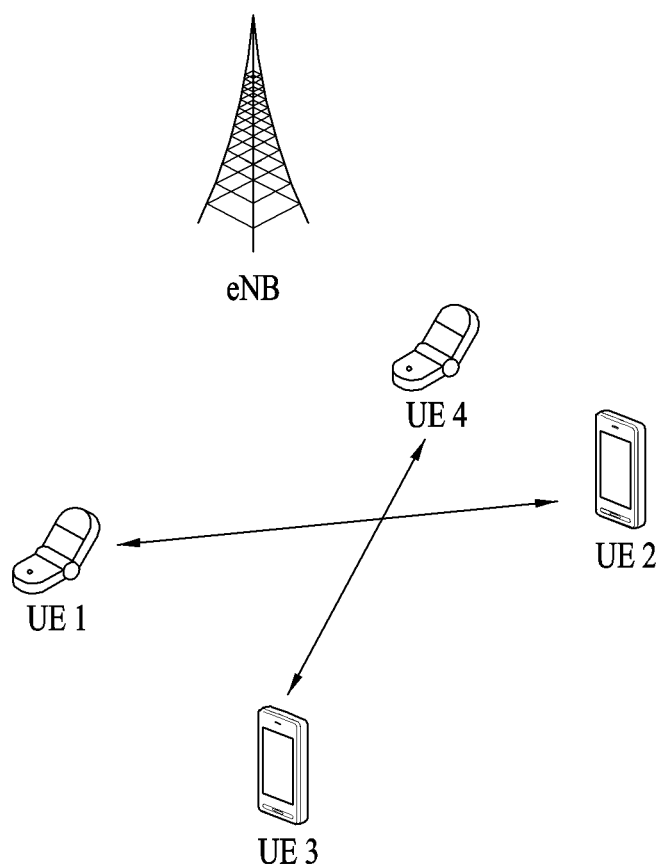
FIG. 7 is a diagram illustrating the concept of device-to-device (D2D) communication.

FIG. 7 illustrates a concept of direct communication between UEs.

Referring to FIG. 7, UE1 and UE2 perform direct communication therebetween, and UE3 and UE4 perform direct communication therebetween. An eNB may control a location of a time/frequency resource, transmission power, etc. for direct communication between UEs through an appropriate control signal. However, when UEs are positioned outside a coverage area of the eNB, direct communication between UEs may be configured to be performed without the control signal of the eNB. Hereinafter, direct communication between UEs will be referred to as device-to-device (D2D) communication.

Hereinafter, a description will be given of a method of mitigating a problem of interference between D2D communication links. First, a description will be given of a basic scheduling operation of a D2D link presumed in the present invention.

A UE attempting to transmit a D2D signal transmits a signal announcing that the UE attempts transmission. The signal is referred to as signal #1 for convenience of description. Signal #1 may include a predetermined signature, and include various types of information of a transmission UE, for example, information about an ID, a buffer state, etc. of the transmission UE for smooth scheduling. Specifically, signal #1 may have a form of a codeword obtained by coding information of the transmission UE through channel coding, or it is possible to transmit one of a plurality of signatures selected stochastically and/or based on the information of the transmission UE.

A plurality of UEs may simultaneously transmit signal #1. Thus, an operation may be performed such that two or more intervals in which signal #1 can be transmitted are defined, and each UE stochastically selects one interval to transmit signal #1. In this way, the plurality of UEs may stochastically transmit signal #1 through different intervals.

A UE receiving signal #1 may respond to signal #1 by transmitting a signal reporting that the transmission UE may start genuine transmission of D2D data. This signal is referred to as signal #2. Characteristically, signal #2 may include information about signal #1 to allow a UE receiving signal #2 to verify whether signal #2 corresponds to a response to signal #1 transmitted by the UE. For example, signal #2 may include information such as a signature used in signal #1, an ID of a UE transmitting signal #1, etc. A UE transmitting signal #1 and receiving signal #2 in response thereto may determine that D2D communication can be performed and perform genuine D2D data transmission. In this regard, the above-described operation may be regarded as a D2D link scheduling operation which indicates that data transmission of a particular D2D link is determined at a particular point in time.

A series of processes may be additionally provided to more efficiently perform the above-described D2D link scheduling operation. First, a rule may be provided such that only a predetermined UE transmits signal #2 rather than an arbitrary UE transmitting signal #2. For example, an operation may be performed such that one representative UE is selected through competition among a series of UEs, preferably, UEs close to one another. Then, for a certain period of time, only the representative UE transmits signal #2 and the other UEs failing to be selected as the representative UE do not transmit signal #2. In this instance, the representative UE may receive signals #1 transmitted by the other UEs, and appropriately collect signals #1 to transmit signal #2.

Signal #2, which is transmitted in response to a plurality of UEs or a plurality of signals #1, performs a function of reporting a time when D2D data can be transmitted, a UE that can transmit D2D data, and signal #1 transmitted by a UE that can transmit D2D data. In this regard, signal #2 may be referred to as a D2D scheduling message. In other words, one D2D cluster including a plurality of UEs is formed and a representative UE is selected. Then, the other UEs except for the representative UE may transmit signal #1 to inform the representative UE that the UEs need to be scheduled. The representative UE generates and transmits signal #2 based on signal #1, thereby performing a control operation such that different UEs transmit D2D data at different points in time. To this end, signal #2 may additionally include information about a time when D2D data is transmitted and a UE that transmits D2D data.

Each UE may be synchronized such that the above-described cluster-based operation is smoothly performed. An operation may be performed such that the UE is synchronized with a signal transmitted by an eNB, or a particular UE transmits a synchronization signal in advance and the other UEs are synchronized with the synchronization signal. Characteristically, the UE transmitting the synchronization signal may become a representative UE of a particular D2D cluster to transmit signal #2. Here, the UE transmitting the synchronization signal functions as the representative UE without a separate UE selection process. Alternatively, when the representative UE is selected, for example, an operation may be performed to have top priority when stochastically transmitting a signal for being selected as the representative UE in order to become the representative UE. For example, for a certain period of time, priority is assigned such that only the UE transmitting the synchronization signal can transmit the signal for being selected as the representative UE.

Additionally, a plurality of D2D clusters may be generated based on a synchronization signal transmitted by one UE. In other words, a plurality of representative UEs may be selected, and the representative UEs are separated from one another such that the other UEs may not be aware of the fact that one UE is selected as a representative UE.

Figure 8:
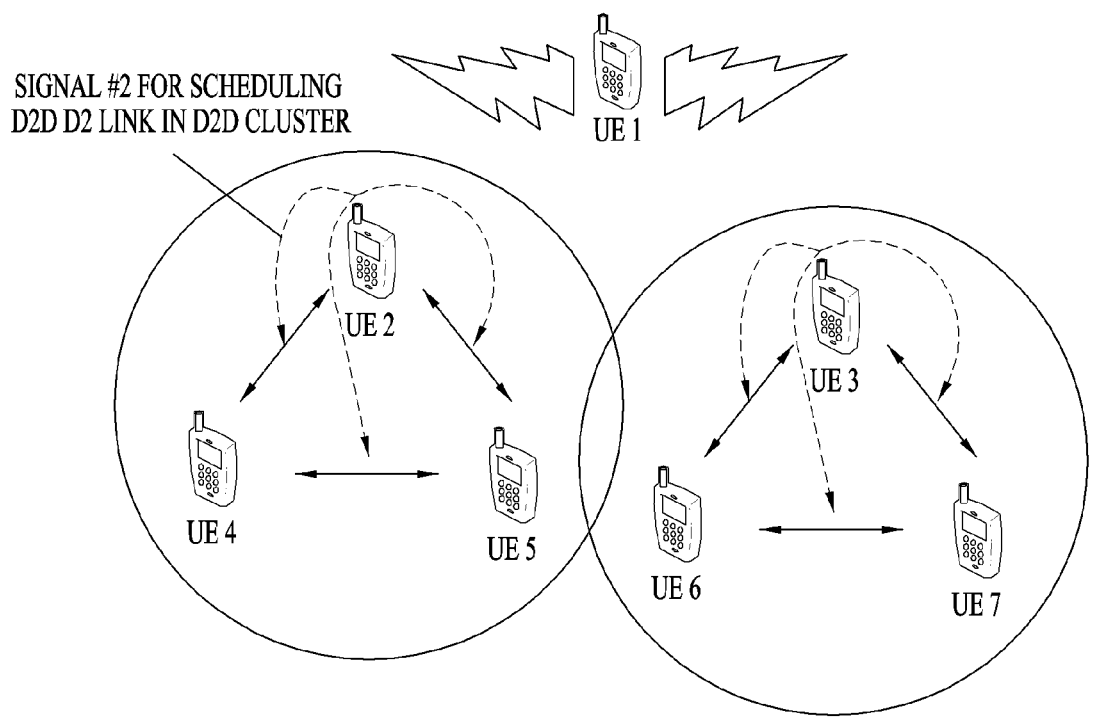
FIG. 8 is a diagram illustrating an example in which a plurality of D2D clusters is generated based on a synchronization signal transmitted by one UE.

FIG. 8 illustrates an example in which a plurality of D2D clusters is generated based on a synchronization signal transmitted by one UE.

Referring to FIG. 8, UE1 is a UE transmitting the synchronization signal, UE2 is a representative UE of a cluster including UE4 and UE5, and UE3 is a representative UE of a cluster including UE6 and UE7. UE1 may be the same as UE2 or UE3. When a process of selecting a representative UE is omitted, all UEs may become a representative UE, which may be regarded as a particular case in which one D2D cluster includes one D2D link.

When the above-described D2D cluster-based scheduling is performed, a problem of interference between D2D links may be solved in one cluster since it is possible to perform a control operation such that different D2D links are transmitted at different points in time while the representative UE transmits signal #2. However, in a D2D link positioned at a boundary of a D2D cluster, the problem of interference may occur. For example, referring to FIG. 8, when UE5 transmits a signal, if UE6 receives the signal, reception performance of UE6 may be greatly degraded due to strong interference from UE5.

Meanwhile, communication such as broadcast in which a plurality of UEs performs reception may be given as a particular example of an operation performed when cluster-based scheduling is performed. Specifically, a transmission UE of D2D communication may form a cluster thereof and become a representative UE of the cluster to rapidly transmit a signal to reception UEs without scheduling operations of other UEs. In this case, the above-described scheduling operation through signal #2 may be omitted.

Besides, even when a representative UE of a cluster is selected, each transmission UE may transmit a data signal by selecting an appropriate resource while omitting the scheduling operation through signal #2. This operation may be appropriate when overhead of a resource consumed in a process of transmitting signal #2 is relatively great. When the process of transmitting signal #2 is omitted, each transmission UE may measure interference from a D2D data signal or signal #1 transmitted by another UE, and may perform the above-described scheduling based on the measured interference. In this process, the D2D data signal or signal #1 may be considered to partially replace a function of signal #2 particularly when verifying a resource in which interference is incurred, a UE that incurs interference, and a type of interference. When scheduling using signal #2 is omitted, scheduling may refer to a scheduling operation in which a separate transmission UE selects a resource for transmission performed by the transmission UE.

Hereinafter, a description will be given of an interference adjustment technique for solving a problem of interference between D2D links.

First, a representative UE of a D2D cluster may receive signal #1 of a UE belonging to another adjacent cluster, thereby verifying the presence of the UE belonging to the other adjacent cluster and whether the UE attempts to transmit a signal. In FIG. 8, UE3 attempts to receive signal #1 transmitted by UE5. When signal #1 is successfully detected, it is possible to verify the presence of UE5 that attempts to transmit a signal in an adjacent cluster.

Here, when a signal of a UE belonging to an adjacent cluster is detected, it can simply mean that the signal is successfully decoded or detected. However, it is possible to additionally provide a condition that reception quality of the signal, for example, a signal-to-noise-plus-interference ratio (SINR) or reception power is greater than or equal to a certain level. The condition may be additionally provided since it is effective to determine that the signal is located within a relatively short distance and perform the interference adjustment technique when signal #1 transmitted from the adjacent cluster has a quality greater than or equal to a certain level. In other words, even when signal #1 of the adjacent cluster is received, if a quality of the signal is low, it is possible to determine that the signal is transmitted by a UE located relatively far away such that the interference adjustment technique is not performed.

To perform this operation, a representative UE of a particular cluster needs to be able to distinguish signal #1 of a UE belonging to the cluster of the representative UE from signal #1 transmitted by a UE belonging to an adjacent cluster. Therefore, the present invention proposes that a separate cluster ID be used for each cluster when a D2D cluster is configured, and proposes that information about the cluster ID be used when signal #1 is transmitted.

An ID of the D2D cluster may be an ID of the representative UE or a particular ID derived from the ID of the representative UE based on a predetermined rule. Alternatively, the ID of the D2D cluster may be stochastically selected when a group of candidates for a certain ID is present and one D2D cluster is configured from the group of candidates, and transmitted to UEs included in the cluster by the representative UE. Alternatively, the ID of the D2D cluster may correspond to a value derived from a used signature or a point in time at which a signal for being selected as the representative UE is transmitted when being selected as the representative UE. Here, when information about the cluster ID is used when signal #1 is transmitted, it can mean that a codeword corresponding to a result of channel coding for signal #1 varies according to the cluster ID, or a transmission resource and/or a signature of signal #1 varies according to the cluster ID. For example, the codeword corresponding to a result of channel coding for signal #1 may be scrambled in a sequence generated from the cluster ID, or a demodulation reference signal corresponding to one of signatures used for transmission of signal #1 may be generated from the cluster ID.

When a representative UE of a particular cluster verifies whether a UE of an adjacent cluster transmits a signal, a resource in which the UE of the adjacent cluster is likely to transmit a signal may not be used for communication in the cluster to which the representative UE belongs if possible, thereby mitigating a problem of interference. In another sense, signal #1 transmitted from the adjacent cluster is used as a warning message for an interference signal. Therefore, the present invention proposes that a resource use priority, indicating which cluster preferentially uses which resource, be configured in advance.

Figure 9:
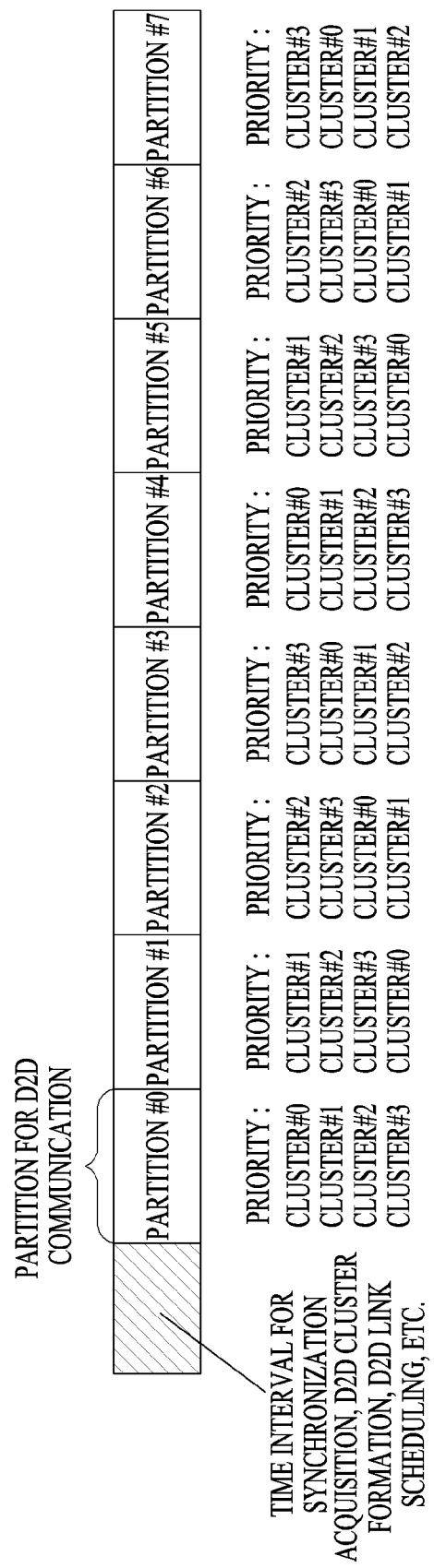
FIG. 9 is a diagram illustrating an example of dividing a time resource for D2D data communication according to an embodiment of the present invention.

FIG. 9 illustrates an example of dividing a time resource for D2D data communication according to an embodiment of the present invention.

Referring to FIG. 9, it can be understood that a time interval available for D2D communication is divided into a plurality of partitions, and then priorities of clusters are differently set for each partition. In order to assign different priorities to a maximum of K D2D clusters, it is possible to presume a case in which D2D cluster IDs are first classified into cluster groups 0 to K−1, a D2D communication interval is divided into N*K partitions, and then priorities are assigned to partition #n (n=0, . . . , N*K−1) in order of cluster group #n mod K, cluster group #(n+1) mod K, . . . , cluster group #(n+K−1) mod K. In particular, FIG. 9 presumes a case in which N=2 and K=4.

A one-to-one relation may be simply configured between a cluster ID and a cluster group. However, a plurality of cluster IDs may be mapped to one cluster group. For example, a remainder obtained by dividing a cluster ID by the number of cluster groups may be used as an ID of a cluster group. In the example of FIG. 9, partition #n has the same priority as partition #n+K, which means that a total of N partitions have the same priority once in K times. Furthermore, priorities in each partition may be determined using various schemes.

Referring to FIG. 9, a partial time interval prior to the time interval used for D2D data communication may be used for the above-described operation for D2D scheduling such as synchronization between UEs, generation of a D2D cluster, selection of a representative UE, transmission of signal #1 and signal #2, etc. A resource use configuration as illustrated in FIG. 9 including an advance preparation interval for UE synchronization and D2D cluster formation and a time interval in which D2D data is transmitted and received may be periodically repeated.

In order to simplify an order of priorities assigned to clusters, an operation may be performed such that, in one partition, a certain number of clusters, for example, one cluster has the same level of high priority, and the other clusters have the same level of low priority. In this case, an operation may be performed such that an ID of a cluster having a high priority in each partition varies according to a partition index.

Meanwhile, when a representative UE of a particular cluster receives signal #1 of an adjacent cluster, a problem of interference may be mitigated by adjusting scheduling in the cluster. For example, it is presumed that a representative UE of cluster #A receives signal #1 of cluster #B or signal #1 having reception quality greater than or equal to a certain level, or receives a location of a resource corresponding to a priority of cluster #B from a reference signal of a representative UE of cluster #B. In this instance, the representative UE of cluster #A may avoid/mitigate interference from cluster #B by performing one of operations below in a partition in which cluster #B is designated to have priority.

Operation 1) The partition in which cluster #B has priority may not be scheduled. In other words, signal #2 is generated and transmitted such that UEs belonging to cluster #A do not transmit D2D data in the corresponding partition. In this way, it is possible to separate a time resource used by a boundary UE of cluster #B from a time resource used by a UE of cluster #A.

Operation 2) The partition in which cluster #B has priority may be scheduled to be used by a UE that is less affected by interference from cluster #B. Specifically, the representative UE of cluster #B may verify a distance between each UE and the representative UE based on quality of signal #1 transmitted by UEs belonging to cluster #B. For example, when it is presumed that each UE transmits signal #1 using the same power, a UE having relatively high reception power of signal #1 may be relatively closer to the representative UE. Each cluster may be formed around a representative UE, and thus a D2D signal of a UE having high reception quality of signal #1 is likely to be transmitted from inside the cluster. Therefore, a resource having low priority may be used for transmission by the UE.

Additionally, when a representative UE can verify expected quality of a D2D signal, a D2D link less affected by interference from cluster #B may be verified at a higher probability. For example, each UE may report reception quality of a signal transmitted by a reception UE of D2D data, in particular, a discovery signal transmitted and received by respective UEs to discover each other to a representative UE through signal #1, etc. When reception quality of the discovery signal additionally reported by a transmission UE of signal #1 is excellent, the representative UE may consider that both the transmission UE and the reception UE are close to the representative UE in a D2D link corresponding to the discovery signal and the D2D link is robust to interference from an outside of the cluster. As described in the foregoing, when a D2D UE less affected by interference from cluster #B uses a partition in which cluster #B has a higher priority, an operation may be performed to reduce transmission power of a D2D data transmission/reception signal.

Operation 3) In the partition in which cluster #B has priority, a D2D signal may be transmitted using relatively low transmission power in cluster #A in order to reduce interference in cluster #B. Preferably, the partition may be used by selecting a UE capable of performing smooth communication using low transmission power. For example, each cluster may transmit a signal in a partition in which an adjacent cluster has priority, that is, the cluster fails to have priority using transmission power to which a certain offset is applied when compared to transmission power in a partition in which the cluster has priority.

Additionally, transmission power may be adjusted to actual transmission power of each D2D signal or a maximum value of transmission power of each D2D signal. Therefore, when sufficient quality is allowed for transmission, an operation may be performed such that transmission power lower than allowed maximum transmission power is used to reduce power consumption of the transmission UE.

However, when the representative UE of cluster #A fails to receive signal #1 of cluster #B or fails to receive a synchronization signal transmitted by the representative UE of cluster #B, it is possible to determine that cluster #B is not present in an adjacent region, and allow free use of a partition in which cluster #B has a higher priority.

Meanwhile, cluster #A needs to appropriately use a resource, that is, a partition in which cluster #A has high priority. In particular, when a partition in which a cluster has high priority is used for transmission by a UE positioned at a boundary of the cluster, it is possible to reduce interference in an adjacent cluster. For example, a representative UE of each cluster may schedule a UE based on reception power of signal #1. In particular, it is preferable to operate to use a partition in which the cluster has high priority on the assumption that a UE having low reception power of signal #1 is positioned outside the cluster. In addition, when it is determined that another cluster is present within a short distance, for example, when a representative UE of a cluster receives signal #1 from an adjacent cluster, an operation needs to be performed such that a UE having low reception power of signal #1 is not allocated to a partition in which priority of the cluster is low.

Figure 10:
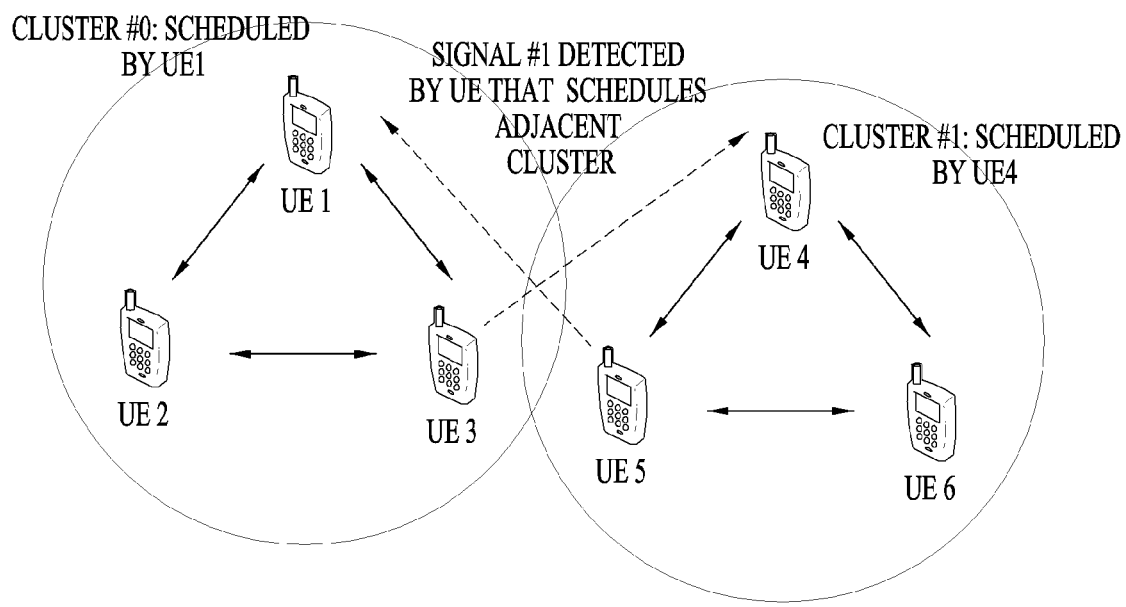
FIG. 10 is a diagram illustrating an example of performing scheduling for a D2D link according to an embodiment of the present invention.

FIG. 10 illustrates an example of performing scheduling for a D2D link according to an embodiment of the present invention. In particular, FIG. 10 presumes a case in which UE1 schedules cluster #0 including UE2 and UE3, and UE4 schedules cluster #1 including UE5 and UE6. In this instance, UE1 and UE4 detect signal #1 of UE5 and UE3, respectively.

Referring to FIG. 10, for a partition in which cluster #0 has high priority, UE1 preferentially schedules UE3 that transmits signal #1 having lower quality. At the same time, UE4 receiving signal #1 from UE3 does not use the partition in which cluster #0 has higher priority or schedules only a D2D link determined to be safe from interference. A similar operation may be applied when UE5 is scheduled for a resource in which cluster #1 has higher priority.

Additionally, a UE other than the representative UE may receive signal #1 from an adjacent cluster. In this case, the UE may deliver the fact that the signal #1 is received from the adjacent cluster to the representative UE and perform the above-described operation. In particular, the fact that signal #1 is received from the adjacent cluster may be included when the UE transmits signal #1. When a plurality of intervals are configured for transmission of signal #1, if a particular UE receives signal #1 of the adjacent cluster at a quality greater than or equal to a certain level at a certain point in time, received signal #1 may be reported to the representative UE using a subsequent transmission interval of signal #1.

For example, referring to FIG. 10, UE1 may not receive signal #1 of UE5 belonging to the adjacent cluster. In this case, UE3 positioned close to UE5 may receive signal #1 transmitted by UE5 and report received signal #1 to UE1, and UE1 may generate signal #2 based on received signal #1. In other words, it can be understood that UE3 relays signal #1 of UE5 to UE1.

Figure 11:
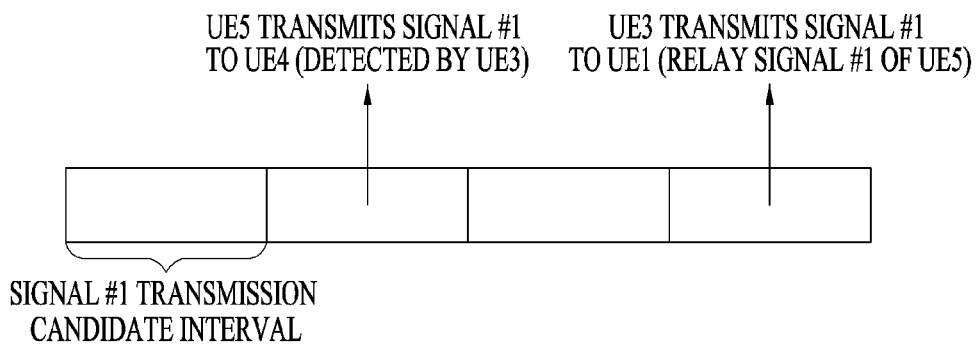
FIG. 11 is a diagram for a description of a concept of relaying signal #1 according to an embodiment of the present invention.

FIG. 11 describes a concept of relaying signal #1 according to an embodiment of the present invention.

Referring to FIG. 11, after a plurality of signal #1 transmission intervals are defined, UE3 first receives signal #1 of UE5 belonging to the adjacent cluster in a particular interval according to FIG. 10. When a quality thereof is greater than or equal to a certain level, another interval is selected to transmit signal #1 to UE1. In this instance, signal #1 transmitted by UE3 may be the same as that transmitted by UE5, or may correspond to signal #1 separately defined to relay transmission in the adjacent cluster.

Meanwhile, when a D2D data transmission/reception interval is divided into a plurality of partitions as in FIG. 9, an operation may be performed such that, when one partition is scheduled for a particular UE, a series of partitions related thereto are automatically scheduled together for the UE in order to reduce overhead of a scheduling message. For example, referring to FIG. 9, when partition #n is allocated to a particular UE, an operation may be performed such that partition #n+4 having the same priority is allocated to the UE. In this case, the UE may use both the partitions to transmit a signal.

Figure 12:
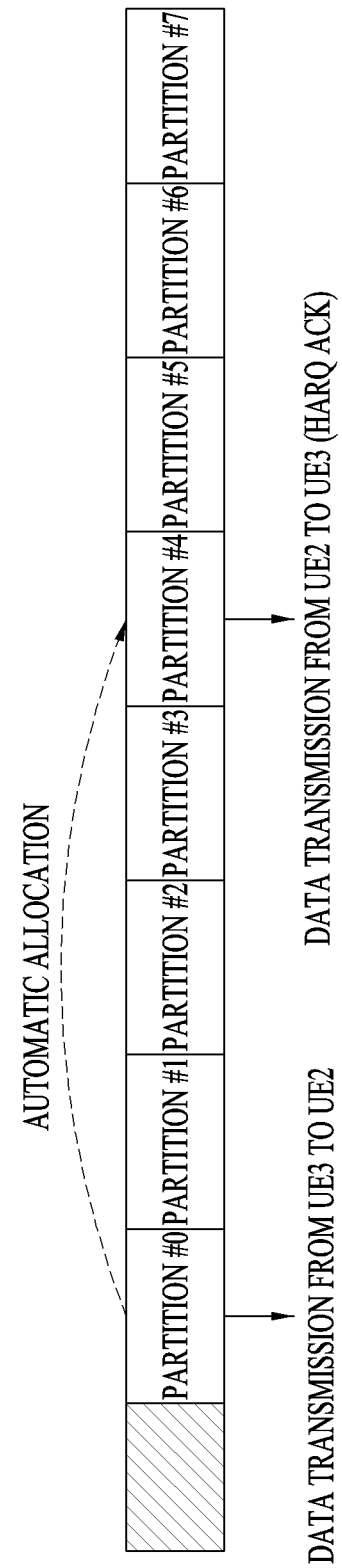
FIG. 12 is a diagram illustrating an example in which a series of partitions are allocated to a particular UE according to an embodiment of the present invention.

FIG. 12 illustrates an example in which a series of partitions are allocated to a particular UE according to an embodiment of the present invention.

Referring to FIG. 12, a series of partitions automatically allocated in response to partition #n being scheduled for a UE may be used to receive a signal including HARQ ACK for data transmitted in partition #n.

An operation of FIG. 12 is extended below. A rule may be provided such that, when a particular UE receives a series of partitions allocated thereto, a transmission operation and a reception operation are alternately repeated in each partition. As a result, the particular UE may transmit and receive D2D data transmitted by the particular UE and a HARQ-ACK signal for the D2D data in a partition having the same priority. In particular, the UE transmitting the D2D data is preferably positioned near a boundary of a cluster.

According to the above description, an operation is performed such that a representative UE of a particular cluster schedules a UE positioned at a boundary of a cluster to transmit D2D data in a partition in which the cluster has high priority, and the partition is not used in an adjacent cluster to avoid interference between clusters. Similarly, when HARQ ACK is transmitted to the scheduled UE, a partition which is not used by the adjacent cluster, that is, a partition in which the cluster has higher priority is used, and thus a UE at a boundary of the cluster may receive HARQ ACK without interference from the adjacent cluster.

Alternatively, for freer selection in a transmission operation and a reception operation, an indicator that indicates selection between the two operations, that is, an indicator that indicates whether a transmission UE in partition #n performs transmission or reception in partition #n+4 may be transmitted together with the D2D data in partition #n to allow a reception UE in partition #n to perform an appropriate operation to be performed in partition #n+4, for example, to verify continuous reception of D2D signals or transmission of a D2D signal including HARQ ACK. In another sense, use of a subsequently allocated partition is designated in transmission in a particular partition.

Further, when a series of partitions are scheduled for a particular UE, the UE may previously designate future use of each partition allocated at an initial transmission time, that is, whether to perform transmission or reception. This operation may be construed as below. When a series of partitions are allocated to a particular UE in a cluster, the UE designates a transmission direction of each of the allocated partitions, that is, which UE performs transmission among UEs included in a D2D link, and reports the UE to the other UE with respect to the D2D link. Therefore, in a partition to which the scheduled UE is automatically allocated, the UE is presumed to become an eNB that operates one TDD cell, and one of uplink/downlink subframe configurations to be used in the allocated partition is considered to be designated. In other words, a partition transmitted by the UE is regarded as a downlink subframe, and a partition received by the UE is regarded as an uplink subframe.

Preferably, when a particular partition #n is allocated and a subsequent partition #n+k is automatically allocated to transmit HARQ ACK for the particular partition #n, k may be greater than or equal to a certain value to ensure a minimum time period at which a UE receiving D2D data decodes the data. For example, when one partition corresponds to 1 ms, k may be greater than or equal to 4 considering a time interval between a PDSCH and HARQ ACK in the 3GPP LTE system. In this case, automatically allocated time partition #n+k may correspond to an initial partition in which the same cluster use priority is configured after partition #n+4. Two or more partitions may be automatically allocated according to the same principle.

As described in the foregoing, when a particular partition is allocated, and other subsequent partitions are automatically allocated, it is preferable that priorities of respective clusters be configured to be the same among the automatically allocated partitions. However, for higher mobility of resource allocation, a series of partitions selected irrespective of use priorities of clusters may be automatically allocated.

When an interval in which D2D data is transmitted and received is divided into several partitions, different priorities may be assigned to the respective partitions according to reception quality of signal #1. In other words, a particular partition is preferentially allocated to a UE transmitting received signal #1 that satisfies a particular condition. For example, an operation may be performed such that a whole partition is divided into partition group #1 and partition group #2, a UE having reception power of signal #1 greater than or equal to a certain level is preferentially allocated to partition group #1, and a UE having reception power of signal #1 less than or equal to a certain level is preferentially allocated to partition group #2.

Figure 13:
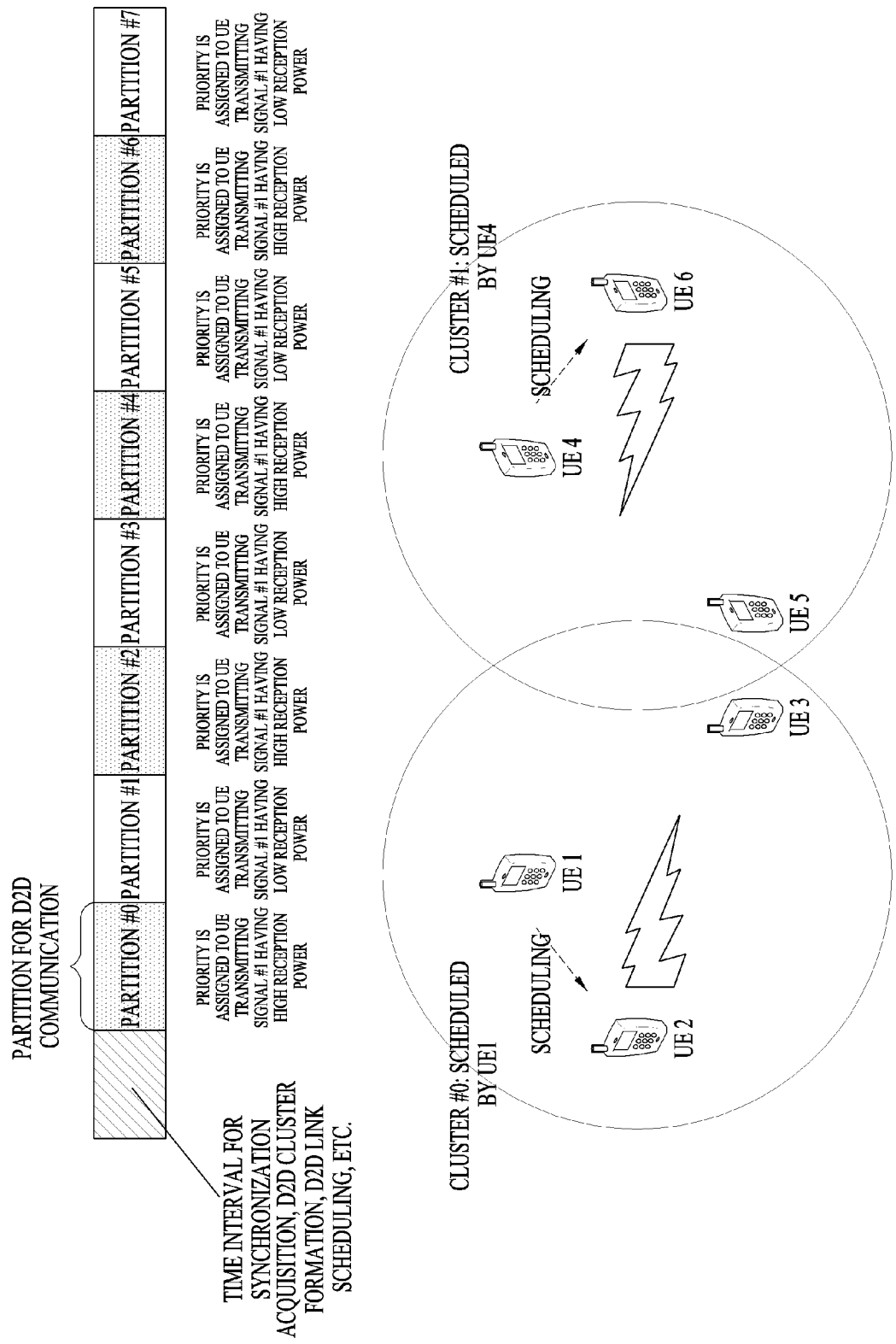
FIGS. 13 and 14 are diagrams illustrating examples in which priority for each partition is determined based on reception power of signal #1 according to embodiments of the present invention.
Figure 14:
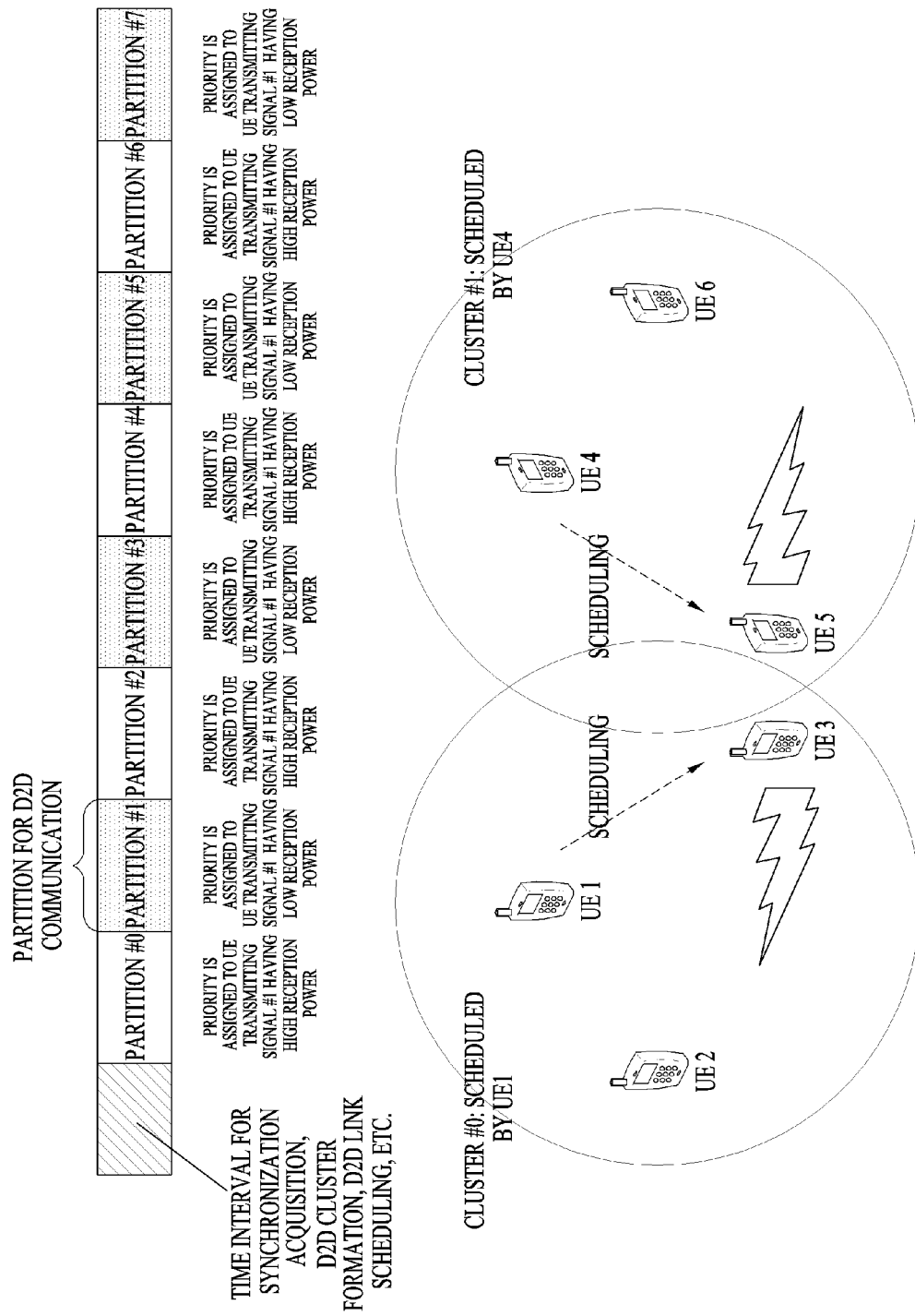

FIGS. 13 and 14 illustrate examples in which priority for each partition is determined based on reception power of signal #1 according to embodiments of the present invention. In particular, FIGS. 13 and 14 presume a case in which a partition of an even index is preferentially allocated to a UE having reception power of signal #1 greater than or equal to a certain level, and a partition of an odd index is preferentially allocated to a UE having reception power of signal #1 less than or equal to a certain level.

Referring to FIG. 13, in partition group #1, UEs in a cluster center close to a representative UE of each cluster, that is, UE2 and UE6 preferentially perform transmission. Thus, it is possible to prevent a case in which a boundary UE of one cluster performs reception while a boundary UE of an adjacent cluster performs transmission. This can be construed as meaning that each cluster is regarded as one cell, and downlink transmission is performed such that a base station in each cell transmits a signal to UEs positioned at a cell boundary.

Referring to FIG. 14, in partition group #2, UEs in an outer part of a cluster separated far from a representative UE of each cluster, that is, UE3 and UE6 preferentially perform transmission. Thus, in particular, when a reception UE of D2D data is positioned in a cluster, interference between clusters decreases. This can be construed that each cluster is regarded as one cell, and uplink transmission is performed such that UEs positioned at a cell boundary in each cell transmit signals to a base station.

However, in this case, even though interference between clusters may be generated when the reception UE is present outside the cluster, a distance between the transmission UE and the reception UE is relatively short, and thus interference is likely to be overcome. For safer data transmission and reception, priorities among clusters as described with reference to FIG. 9 may be additionally defined in a partition which is preferentially allocated to a UE having reception power of signal #1 less than or equal to a certain level.

In operations of FIGS. 13 and 14, some partitions may be allocated to a UE having low priority. As an example, when a representative UE of a particular cluster fails to receive signal #1 of an adjacent cluster, or UEs belonging thereto verify the fact that signal #1 of the adjacent cluster fails to be received, a partition may be allocated to a UE having low priority without concern about a problem of interference on the assumption that another cluster is not activated near the cluster. As another example, when a representative UE of a cluster verifies that a particular D2D link is significantly robust to interference between clusters, in other words, for example, when a transmission UE and a reception UE are significantly close to each other, transmission of the D2D link may be scheduled in a partition expected to be greatly interfered by an adjacent cluster (for example, a partition determined to be transmitted in the adjacent cluster by a UE outside the cluster).

As a criterion of giving priority of use of a partition to a UE described with reference to FIGS. 13 and 14, it is possible to use a power level of a signal transmitted by a representative UE of a cluster and received by each UE instead of a power level of signal 1 received by the representative UE of the cluster from each UE. In other words, when reception power of a signal transmitted by the representative UE of the cluster and received by a particular UE is greater than or equal to a certain level, the representative UE is regarded as a UE positioned inside the cluster as in a case in which reception power of signal 1 transmitted by the UE and received by the representative UE of the cluster is greater than or equal to a certain level. When reception power of a signal transmitted by the representative UE of the cluster and received by a particular UE is less than or equal to a certain level, the representative UE is regarded as a UE positioned outside the cluster as in a case in which reception power of signal 1 transmitted by the UE and received by the representative UE of the cluster is less than or equal to a certain level.

As described in the foregoing, when a plurality of D2D clusters are generated, D2D communication may be performed by causing interference therebetween. In particular, a reference signal functioning as time synchronization of two adjacent D2D clusters may be transmitted by different UEs at different points in time. Hereinafter, a description will be given of a method of solving a problem of interference occurring among a plurality of D2D clusters having different time synchronization.

Figure 15:
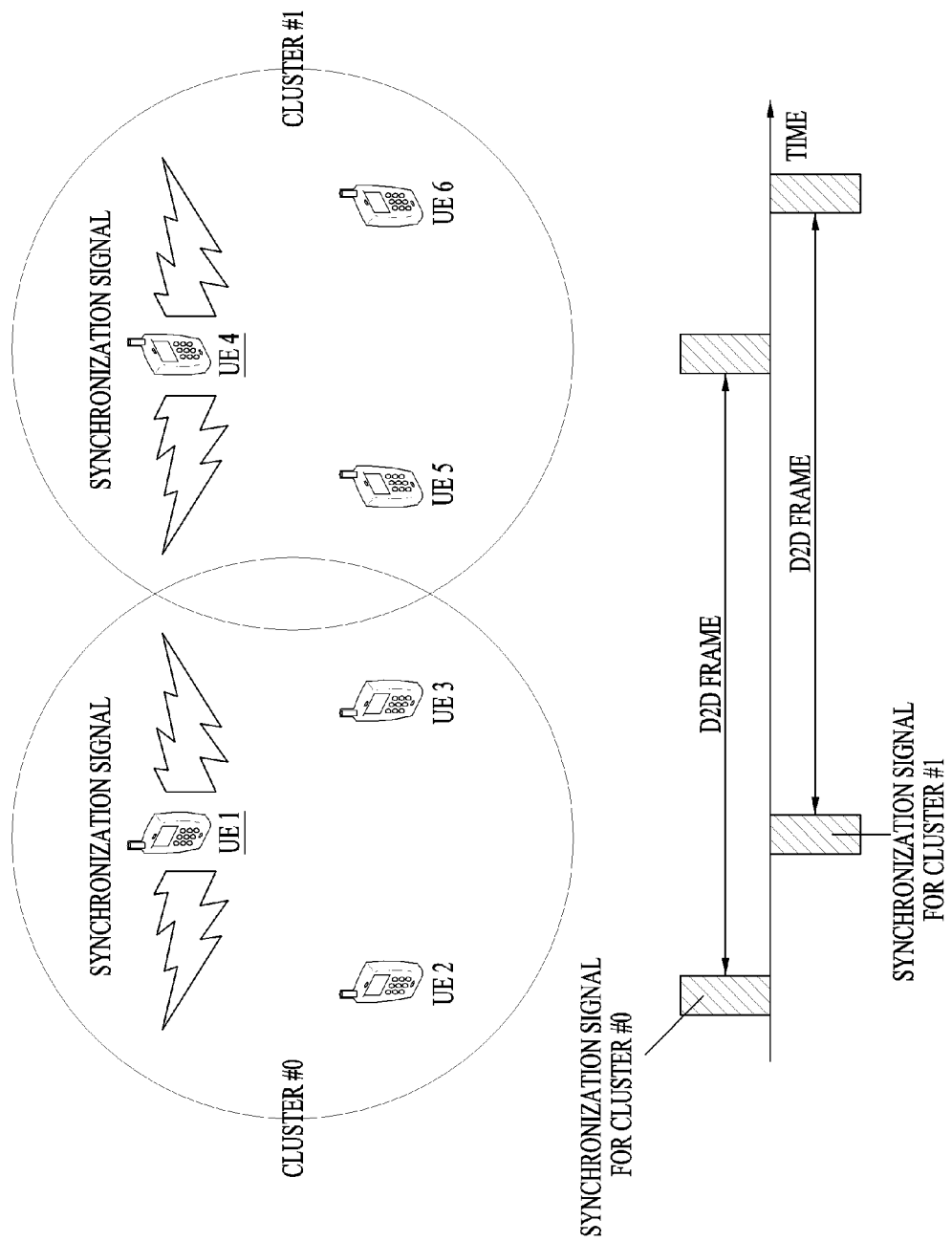
FIG. 15 is a diagram illustrating a method of solving a problem of interference that occurs when a plurality of D2D clusters is generated according to an embodiment of the present invention.

FIG. 15 describes a method of solving a problem of interference that occurs when a plurality of D2D clusters is generated according to an embodiment of the present invention.

Referring to FIG. 15, a certain partition starting from a synchronization signal transmitted by a UE may be defined as a D2D frame of a D2D cluster. A partition in one D2D frame may be divided into several partitions and used to transmit and receive various signals for D2D data transmission/reception and D2D operation. When one D2D frame ends, a synchronization signal may be transmitted again according to a predetermined rule. Here, several UEs may transmit anew synchronization signal using a stochastic scheme, or a UE previously transmitting a synchronization signal may preferentially retransmit the synchronization signal.

When two adjacent clusters operate D2D frames with different time synchronizations as in FIG. 15, it would be helpful for UEs positioned at a boundary of the two clusters, that is, UE3 and UE5 to verify synchronization of adjacent clusters. For example, when a D2D cluster having different synchronization is determined to be present in an adjacent place, a suitable interference adjustment technique is implemented. Otherwise, an operation may be performed without the interference adjustment technique. In this instance, when a particular UE continuously attempts to detect an adjacent D2D cluster, a problem may occur in that the UE consumes excessive power.

Therefore, each UE preferably attempts to intermittently detect whether an adjacent D2D cluster is present. For example, each UE may operate to attempt to detect whether an adjacent D2D cluster is present once in N D2D frames.

Figure 16:
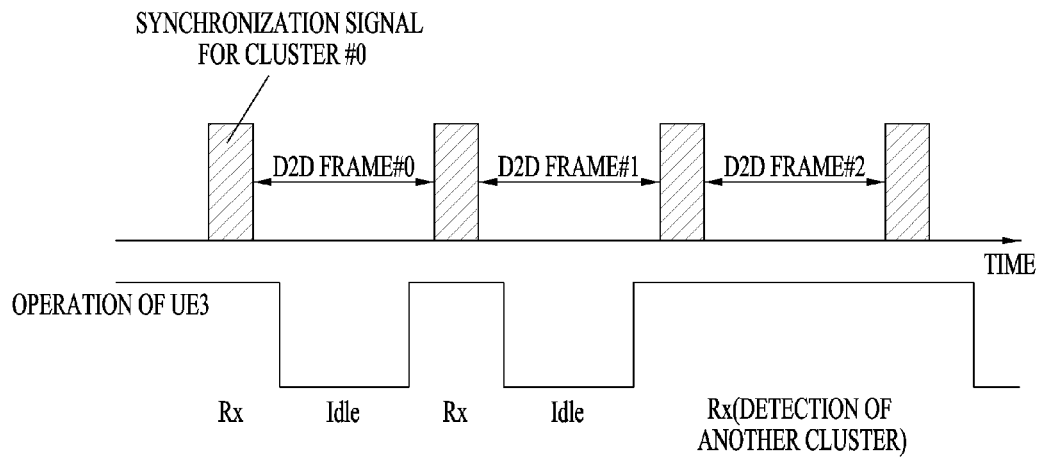
FIG. 16 is a diagram illustrating an example of intermittent detection of the presence of an adjacent cluster according to an embodiment of the present invention.

FIG. 16 illustrates an example of intermittent detection of the presence of an adjacent cluster according to an embodiment of the present invention. In particular, FIG. 16 corresponds to a case of N=3.

Referring to FIG. 16, UE3 presumes a case in which D2D traffic is not present, and performs an operation of receiving a synchronization signal of cluster #0 to which UE3 belongs or various control signals according to the synchronization signal, and then turning OFF a communication circuit until a point in time at which a synchronization signal of a subsequent D2D frame is transmitted to save power. Even when the operation is performed, a cluster detection operation may be performed without turning OFF the communication circuit to detect another D2D cluster in some D2D frames. In FIG. 16, the cluster detection operation is performed in D2D frame #2. When a UE discovers another adjacent D2D cluster, the UE may report the discovered cluster to another UE and use the discovered cluster as reference data when performing a D2D operation thereof.

When a particular UE discovers another adjacent D2D cluster, the UE needs to verify the fact that a D2D signal transmitted by the UE may interfere with the other D2D cluster, and perform an appropriate operation for preventing interference. Discovery of the adjacent D2D cluster may indicate a case in which the UE successfully detects a synchronization signal of the adjacent D2D cluster. However, the case may be restricted to a case in which the synchronization signal of the adjacent D2D cluster is received with power greater than or equal to a certain level in order to restrict the case to a case in which the adjacent D2D cluster is sufficiently close. When the synchronization signal is received with power less than the certain level, an interference prevention operation may not be performed on the assumption that the adjacent D2D cluster is sufficiently far away. When a significant signal in a D2D operation such as a synchronization signal of a D2D cluster encounters interference, a great problem may occur in the D2D operation. Thus, interference with the significant signal needs to be restricted as much as possible. Therefore, when the particular UE discovers the adjacent D2D cluster, the UE may operate to reduce transmission power of a D2D signal or not to transmit a D2D signal by setting transmission power to 0 in a resource in which a significant signal of the adjacent D2D cluster is expected to be transmitted.

Figure 17:
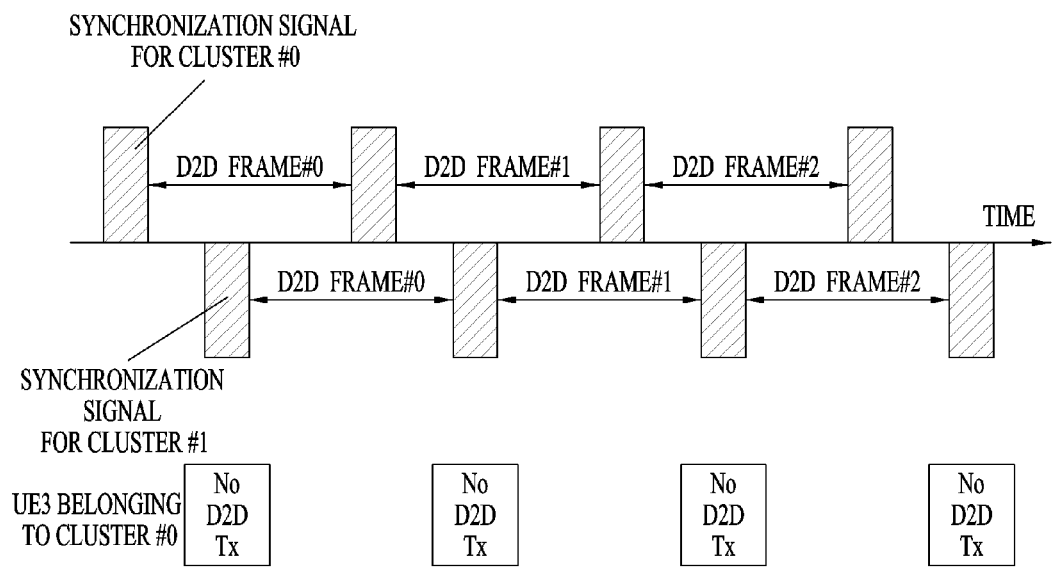
FIG. 17 is a diagram illustrating an example in which a D2D signal is not transmitted in a region in which a synchronization signal of an adjacent cluster is expected to be transmitted according to an embodiment of the present invention.

FIG. 17 illustrates an example in which a D2D signal is not transmitted in a region in which a synchronization signal of an adjacent cluster is expected to be transmitted according to an embodiment of the present invention. In other words, a UE detecting the adjacent cluster may operate not to transmit the D2D signal in a region near the region in which the synchronization signal of the adjacent cluster is expected to be transmitted.

In general, a synchronization signal is transmitted according to predetermined period, and thus a subsequent transmission time point can be predicted. To compensate for an error in expecting the subsequent transmission time point, a certain region near the point in time at which transmission is expected may be regarded as an interval for protecting a synchronization signal of the adjacent cluster. Here, when a D2D signal is not transmitted, it can mean that a signal is not transmitted even when D2D communication is scheduled, or a channel is occupied and a series of signals, which are transmitted to perform a D2D transmission/reception operation, are not transmitted.

When the synchronization signal of the adjacent D2D cluster is protected through an operation of FIG. 17, another significant signal to be protected is preferably protected by being transmitted at a similar point in time. Signal #1 and a discovery signal transmitted by UEs to discover each other may be given as examples of the significant signal.

Figure 18:
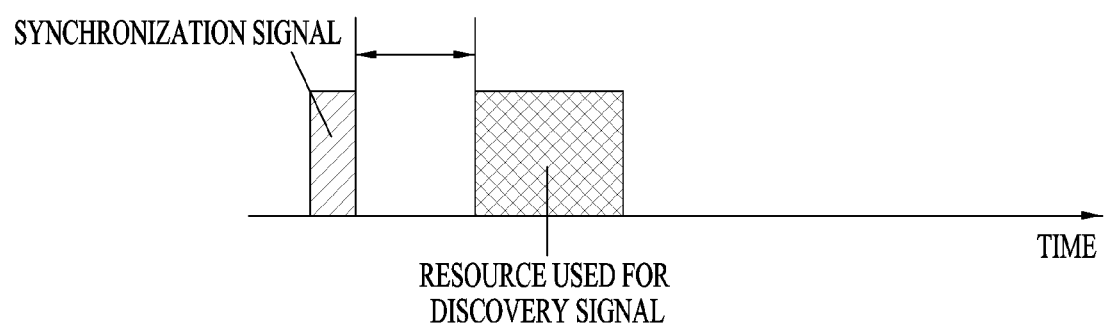
FIG. 18 is a diagram illustrating a resource for transmitting a significant signal according to an embodiment of the present invention.

FIG. 18 illustrates a resource for transmitting a significant signal according to an embodiment of the present invention. FIG. 18 illustrates only a discovery signal. However, signal #1 described above may be illustrated as the significant signal.

Referring to FIG. 18, a rule may be provided such that a discovery signal is transmitted at a point in time separated from a synchronization signal of a D2D cluster by a predetermined interval. According to the rule, when a UE of an adjacent D2D cluster omits transmission of a D2D signal once or reduces transmission power, it is possible to protect the discovery signal in addition to the synchronization signal. For a more flexible configuration of a location of a resource for the discovery signal, it is possible to report, through the synchronization signal, location information of a resource in which the discovery signal is transmitted, for example, an interval from the synchronization signal and/or a length of time during which the discovery signal is transmitted. When resource location information of the discovery signal is configured through the synchronization signal, UEs of an adjacent cluster may verify a location of the discovery signal to be protected by the UEs by detecting the synchronization signal.

Meanwhile, when each UE frequently detects a synchronization signal of an adjacent cluster, power may be excessively consumed. Therefore, an operation may be performed such that the synchronization signal of the adjacent cluster is detected once in N D2D frames on the assumption that the adjacent cluster is continuously maintained without being frequently changed. In this case, even though the synchronization signal of the adjacent cluster is not detected, it is preferable to perform an operation of reducing transmission power of a D2D signal or not transmitting a signal in a partition in which a significant signal is determined to be transmitted in an adjacent cluster as a result of previous detection.

Besides, to allow two adjacent D2D clusters to perform D2D communication without interference therebetween, it is preferable that a certain time resource be preferentially used by one D2D cluster. In this instance, when the operation of FIG. 17 is extended, one D2D cluster may preferentially perform D2D communication in a certain interval from a point in time at which a synchronization signal is transmitted, and a UE of an adjacent cluster may perform an operation of reducing transmission power of a D2D signal or not transmitting a signal in a corresponding partition. A location at which each cluster preferentially performs D2D communication may be expressed by location information of a resource in which a significant signal such as a discovery signal is transmitted, for example, an interval from the synchronization signal and/or a length of time during which the significant signal such as the discovery signal is transmitted as described above, and may be delivered to adjacent UEs as a partial element of the synchronization signal.

In addition, to smoothly perform an operation when a plurality of partitions are automatically allocated by one resource allocation as illustrated in FIG. 12, a location of a partition in which each cluster has priority may be repeated several times at different points in time in one D2D frame. For example, to perform an operation as in FIG. 12, a point in time at which a particular cluster has priority may be repeated at an interval of 4 ms, and corresponding information may be delivered to adjacent UEs as a part of location information of a resource in which a significant signal is transmitted.

Figure 19:
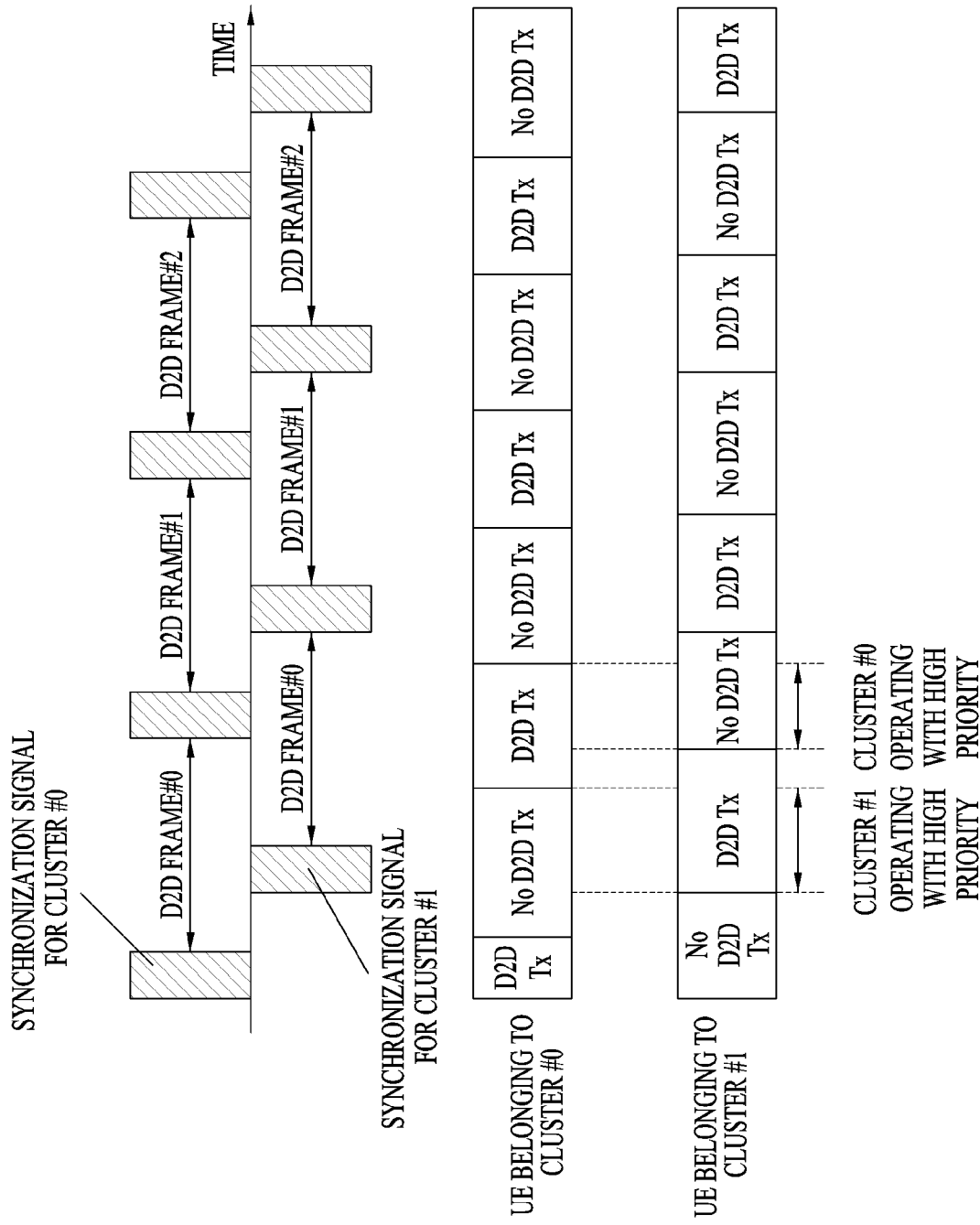
FIG. 19 is a diagram illustrating an example of configuring a time interval in which D2D communication is performed according to an embodiment of the present invention.

As a result, as illustrated in FIG. 19, each cluster may perform D2D communication without interference from another cluster at a certain point in time after transmission of a synchronization signal thereof, and may perform D2D communication which is not greatly affected by the presence/absence of an adjacent D2D cluster as in communication between UEs present in the cluster at another point in time. FIG. 19 illustrates an example of configuring a time interval in which D2D communication is performed according to an embodiment of the present invention.

When two D2D clusters transmit synchronization signals at substantially the same point in time, regions in which transmission of D2D signals are suspended may overlap each other to protect each other. In this case, an operation may be performed such that the synchronization signals of the two clusters are sufficiently separated from each other when a UE of one cluster transmits the synchronization signal of the other cluster at an appropriate point in time.

Figure 20:
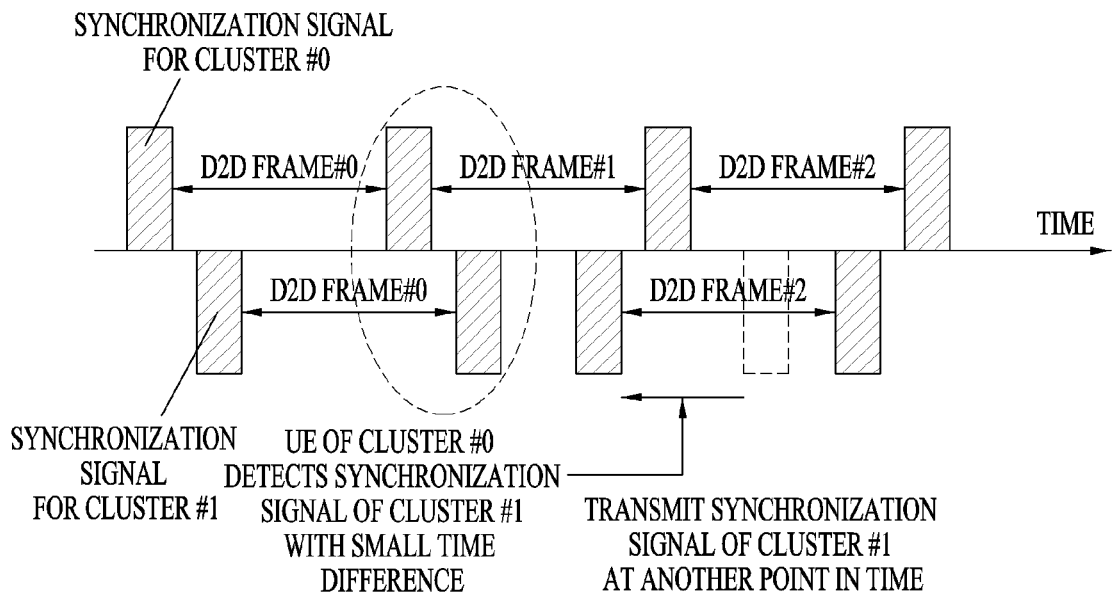
FIG. 20 is a diagram illustrating an example of determining a point in time at which a synchronization signal is transmitted according to an embodiment of the present invention.

FIG. 20 illustrates an example of determining a point in time at which a synchronization signal is transmitted according to an embodiment of the present invention.

Referring to FIG. 20, when a UE belonging to cluster #0 detects a synchronization signal of cluster #1 corresponding to another cluster within a certain period of time from a synchronization signal of the cluster to which the UE belongs, the UE configures a boundary of a D2D frame of cluster #1 to be greatly different from that of cluster #0 by transmitting the synchronization signal of cluster #1 before a subsequent synchronization signal of cluster #1 is transmitted. In another sense, in FIG. 19, a point in time at which the synchronization signal of cluster #1 is transmitted may be considered to be greatly advanced by the UE belonging to cluster #0.

As described in the foregoing, an operation of changing a point in time at which a synchronization signal is transmitted may be performed by a UE of cluster #1 which recognizes a circumstance in which two clusters transmit synchronization signals at similar points in time. In other words, referring to FIG. 20, the UE of cluster #1 detecting the circumstance may configure the boundary of the D2D frame of cluster #1 to be greatly different from that of cluster #0 by transmitting the synchronization signal of cluster #1 before the subsequent synchronization signal of cluster #1 is transmitted. In this instance, to allow UEs previously belonging to cluster #1 to receive the synchronization signal of cluster #1 transmitted at a new point in time, a UE detecting a synchronization signal of another cluster transmitted at an adjacent point in time or before a synchronization signal of a cluster thereof may operate to continuously attempt to receive a synchronization signal by verifying that a point in time at which the synchronization signal of the cluster to which the UE belongs may be changed during at least a certain period of time.

An operation of FIG. 20 may be used to adjust interference between clusters when a new cluster is formed. For example, even when a particular UE detects a synchronization signal of a particular cluster, the UE may operate to generate another cluster under a certain condition. Examples of the condition may include a case in which a quality of a cluster synchronization signal detected by the UE is poor. In this case, a separate cluster for adjacent UEs may be preferably formed.

A quality of a synchronization signal may be expressed by a ratio of a strength of power of a received cluster synchronization signal or power of the received cluster synchronization signal to a whole signal strength detected in a corresponding resource. When the quality is less than or equal to a certain level, the UE may operate to generate a separate cluster. If a plurality of cluster synchronization signals are detected, the UE may operate to generate a separate cluster when qualities of all detected cluster synchronization signals are less than or equal to the certain level.

In this instance, a plurality of UEs may compete for transmission of a new cluster. An operation may be performed such that a UE, which is far away from an existing cluster and has a poor reception quality of a synchronization signal of the existing cluster, preferentially transmits a synchronization signal of a new cluster, thereby appropriately maintaining a spatial distance between two cluster synchronization signal transmission UEs. For example, an operation may be performed such that, when synchronization signal reception quality of the existing cluster is poor, a cluster signal transmission probability value, which is applied when a UE attempts to transmit the synchronization signal of the new cluster, is set to a high value, or a size of a backoff window, which is applied when the synchronization signal of the new cluster is transmitted, is set to a low value. Specifically, a UE desiring to transmit the synchronization signal of the new cluster may initialize a counter by stochastically selecting an integer between 0 and the backoff window, repeat an operation of decrementing the counter by 1 when a new synchronization signal is not detected during a unit time, and perform an operation of transmitting the synchronization signal of the new cluster when the counter becomes 0. In this case, setting the size of the backoff window to a low value is effective in attempting transmission of the synchronization signal of the new cluster at a higher probability.

When a series of operations described above are performed, the synchronization signal of the new cluster transmitted by the UE is preferably separated from the synchronization signal of the existing cluster detected by the UE. In this way, it is possible to prevent interference between cluster synchronization signals and prevent interference between significant signals determined based on locations of the cluster synchronization signals.

Figure 21:
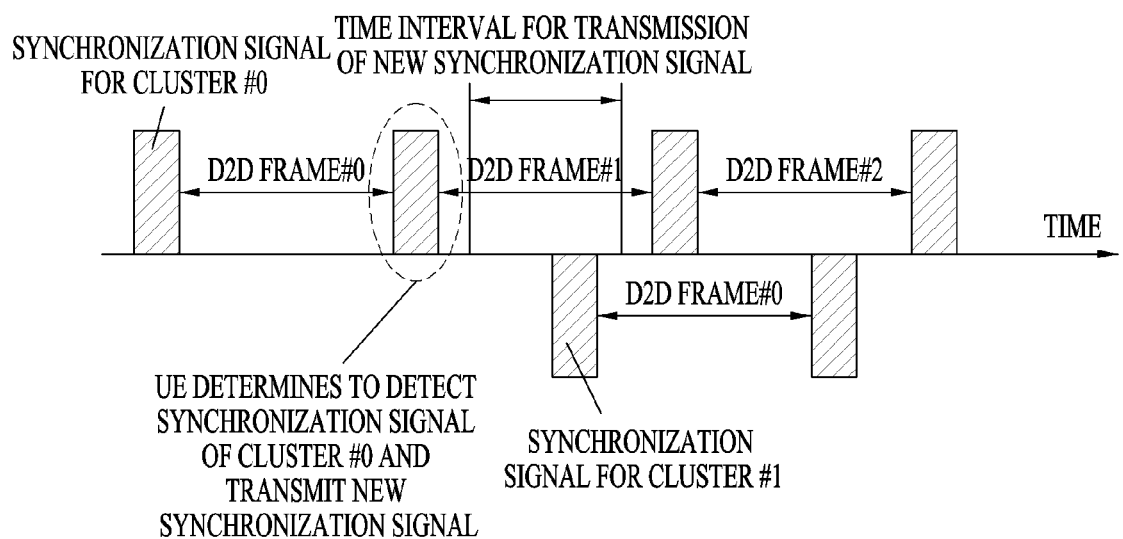
FIG. 21 is a diagram illustrating an example of transmitting a synchronization signal of a new cluster according to an embodiment of the present invention.

FIG. 21 illustrates an example of transmitting a synchronization signal of a new cluster according to an embodiment of the present invention.

Referring to FIG. 21, even though a UE detects a synchronization signal of cluster #0, the above-described condition is satisfied, and thus the UE determines to generate new cluster #1 and transmit a synchronization signal of the new cluster #1. In this instance, it is preferable that the UE sufficiently separate the synchronization signals of the two clusters from each other by transmitting the synchronization signal of cluster #1 using a certain time domain determined based on a reception time of the detected synchronization signal of cluster #0.

In operations of FIGS. 20 and 21, examples of a specific method of separating a synchronization signal of an existing cluster (cluster #0 in FIGS. 20 and 21) from a newly transmitted cluster synchronization signal (synchronization signal of cluster #1 in FIGS. 20 and 21) may include embodiments below and a combination thereof.

a) Transmission of a new cluster synchronization signal may be restricted during a certain partition starting from a point in time $t_0$ at which a synchronization signal of an existing cluster is received. For example, the new cluster synchronization signal cannot be transmitted in an interval from $t_0$ to $t_0+T_a$.

b) Transmission of a synchronization signal of a new cluster may be restricted near a point in time at which an existing cluster is expected to transmit a subsequent synchronization signal. For example, when a synchronization signal transmission period of the existing cluster is P, the new cluster synchronization signal cannot be transmitted in an interval from $t_0+P-T_b$ to $t_0+P$.

In addition to a restriction of a) or b), a rule may be provided such that a subframe boundary of a newly generated cluster matches a subframe boundary of an existing cluster. For example, when one D2D frame is divided into subframes having a plurality of fixed time lengths, if a cluster synchronization signal occupies one or more subframes, a start point at which a synchronization signal of a new cluster starts to be transmitted matches a subframe boundary of the new cluster. Therefore, a rule may be provided such that the synchronization signal of the new cluster is transmitted from a point in time of the subframe boundary of the existing cluster to allow the subframe boundaries of the two clusters to match each other. In this way, it is possible to control interference between two clusters in terms of subframe. In other words, it is possible to perform an operation in which one cluster suspends transmission in one subframe, and an adjacent cluster performs communication with low interference in the corresponding subframe.

Meanwhile, when two or more existing clusters are detected, the above-described restrictions may be applied to each of the clusters. Alternatively, to prevent a point in time, at which a synchronization signal of a new cluster is transmitted, from being excessively restricted, one representative cluster may be selected such that the above-described restrictions are applied only to the representative cluster. For example, a cluster having the best reception quality of a cluster synchronization signal, that is, a cluster determined to be positioned at a closest place may be selected as a representative existing cluster among existing clusters, and an operation may be performed to transmit a new cluster synchronization signal such that the signal is separated only from a synchronization signal of the representative existing cluster.

When the above-described operation is performed, various parameters, in particular, a parameter such as $T_a$ or $T_b$ that defines an interval in which a new cluster synchronization signal can be transmitted may be fixed to a particular value in advance. However, the parameters may be appropriately adjusted according to circumstance. Hereinafter, a detailed description thereof will be provided.

1) When a UE is present in a coverage area of a base station, the base station may signal a parameter value to the UE.

2) Alternatively, when a cluster is generated, a representative UE may configure a parameter to be applied based on a point in time at which a synchronization signal of the cluster is received, and signal the parameter to neighbor UEs. For example, when a particular UE transmits a synchronization signal, it is possible to signal, to neighbor UEs, a parameter to be used when other UEs receiving the synchronization signal determine a point in time at which a new synchronization signal is to be transmitted, that is, a parameter that determines a location of a resource preferentially used by a representative UE of a cluster. In particular, a rule may be provided such that the parameter is derived from generation information of the synchronization signal, for example, an initial value of a pseudo random sequence included in the synchronization signal. A UE transmitting the cluster synchronization signal may transmit the synchronization signal using the generation information of the synchronization signal which indicates appropriate values of $T_a$ and $T_b$.

In this way, the UE transmitting the synchronization signal may adjust the synchronization signal thereof and a region occupied by a significant signal determined from the synchronization signal, that is, a region desired to be protected from a signal of another cluster based on a size of the cluster of the UE, the number of UEs connected to the cluster, etc. For example, when more UEs are expected to belong to the cluster thereof as in a case in which transmission power of the synchronization signal is high, the wider time domain may be used to transmit and receive the significant signal in the cluster thereof by setting $T_a$ and $T_b$ to higher values. In addition, corresponding information may be reported by adding certain bits to the synchronization signal transmitted by the representative UE.

3) A parameter may be adjusted based on the number of existing clusters detected by a UE desiring to transmit a new cluster synchronization signal. Preferably, when a great number of existing clusters are detected by the UE, an interval for protecting a synchronization signal of a separate cluster may be decreased. In this way, it is possible to prevent a period of time, at which a new cluster synchronization signal can be transmitted, from being extremely restricted when a lot of clusters are detected. For example, when $T_{a,default}$ and $T_{b,default}$ determined in advance are present, and K existing clusters are detected, an operation may be performed such that used $T_a$ and $T_b$ become $T_{a,default}/K$ and $T_{b,default}/K$, respectively.

4) A parameter may be adjusted based on a quality of an existing cluster synchronization signal detected by a UE desiring to transmit a new cluster synchronization signal. When a signal having a relatively high quality is detected, interference relation with the existing cluster may be determined to be significant. In this instance, relatively great $T_a$ and $T_b$ may be used to more actively protect a significant signal of the existing cluster.

Meanwhile, a UE forming a new cluster may directly receive location information of a resource in which a significant signal reported by a representative UE of an existing cluster is transmitted, and perform the above-described operation, thereby protecting a resource preferentially used by the existing cluster. Therefore, a resource declared to be a resource preferentially used by the representative UE of the existing cluster, or a resource declared to be a transmission resource of a significant signal may be construed as a message previously reporting that the representative UE may greatly interfere with an adjacent cluster. At the same time, the resource may be construed as a message requesting that adjacent clusters reduce occurrence of interference in the corresponding resource.

In addition, the UE forming the new cluster preferably configures a resource which is not preferentially used by the representative UE of the existing cluster as a resource preferentially used by the UE. However, in some cases, all resources may be preferentially used by the representative UE of the existing cluster. In this case, it is possible to consider an operation i) a cluster is not formed when the amount of resources that can be preferentially used by the UE does not reach a certain level. This operation may indicate that the UE joins the existing cluster to perform D2D communication. The certain level may be expressed by the number of resources that can be declared to be preferentially used, determined in advance such as at least one subframe per 10 ms, or determined based on the amount of traffic applied to the UE. Alternatively, ii) a resource preferentially used by a representative UE which is relatively far away among resources preferentially used by representative UEs of the existing cluster may be preferentially used by the UE. Here, a distance from a representative UE of the existing cluster may be estimated from a synchronization signal transmitted by each cluster representative UE. When reception power is weak, the signal may be regarded as a signal of a representative UE which is far away.

Here, an existing cluster representative UE regarded as valid by the UE forming the new cluster may be restricted to a cluster representative UE which is separated from the UE within a certain distance or has reception power of a synchronization signal greater than or equal to a certain level in order to prevent a case of managing an excessively great number of existing cluster representative UEs.

Figure 22:
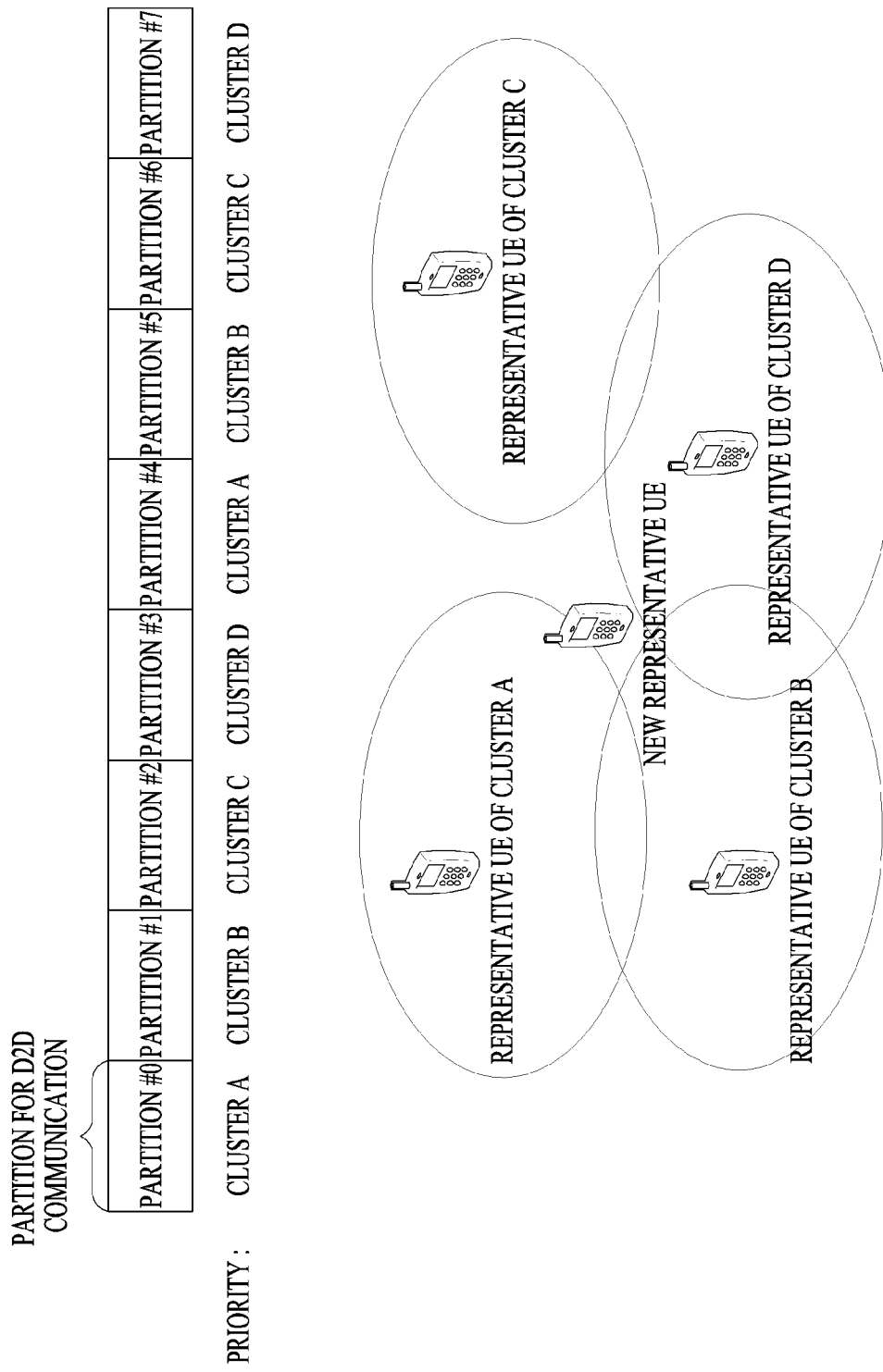
FIG. 22 is a diagram illustrating an example of forming a new cluster according to an embodiment of the present invention.

FIG. 22 illustrates an example of forming a new cluster according to an embodiment of the present invention. In particular, FIG. 22 presumes a case in which a resource preferentially used by a representative UE which is relatively far away among resources preferentially used by representative UEs of the existing cluster is preferentially used by the UE according to the above scheme ii).

Referring to FIG. 22, it can be understood that priority is assigned to existing clusters #A, B, C, and D in partitions in which results of (partition index mod 4) are 0, 1, 2, and 3, respectively. In this case, a UE desiring to become a new cluster representative UE may verify synchronization signal reception power from each existing cluster representative UE, regard cluster C corresponding to lowest reception power as a farthermost cluster, and declare that partition #2 is preferentially used by the UE.

When a plurality of adjacent clusters have priorities in different resource regions as in FIG. 22, if a great number of UEs are present or heavy traffic needs to be processed in a particular cluster, a resource preferentially used by the cluster may be insufficient.

In this case, a resource preferentially used by an adjacent cluster, in other words, a resource which is not preferentially used by the cluster may be used. In this way, priority of a resource for each cluster indicates that a resource to which priority is assigned is preferentially selected when a resource for D2D communication is selected in a particular cluster. Here, depending on cases, even when priority is assigned to a resource, a resource to which priority is not assigned may be used. As described in the foregoing, as an example, the resource to which priority is not assigned is used with low transmission power.

As another example, when each transmission UE selects a resource to be used for D2D transmission thereof, the transmission UE may apply a type of selection metric to each resource (a metric in D2D resource #m is denoted by $X_m$), and adjust a probability of resource selection according to the selection metric. Here, a D2D resource indicates a resource unit in which the UE transmits D2D data. The D2D resource may be expressed by a particular time, a particular frequency, or a combination of the particular time and the particular frequency.

Examples of the selection metric may include a selection metric based on an interference level measured in each resource. A UE may measure several D2D resources, and select and use a resource having a low interference level, that is, low measured power or energy as a D2D transmission resource thereof. In other words, metric $X_m$ in D2D resource #m is defined as an energy level measured in D2D resource #n, and a resource, a metric of which is as low as possible, is preferentially selected. In final resource selection, a resource having lowest or highest metric $X_m$ may be selected, a resource may be stochastically selected among several resources having low metrics $X_m$ or several resources having high metrics $X_m$, or a probability that resource #m will be selected may be configured to be inversely proportional to (or proportional to) metric $X_m$.

In this instance, as a scheme of applying priority to each cluster, when metric $X_m$ of D2D resource #m is calculated, an appropriate correction value $Y_m$ may be added depending on whether the resource has priority in a cluster to which a UE belongs.

As an example, when final metric $Z_m$ is defined as $X_m+Y_m$, and a selection probability increases as $Z_m$ decreases, $Y_m$ which is used when D2D resource #m belongs to a resource having priority may be set to be smaller than $Y_m$ which is used otherwise. For example, $Y_m=0$ may be applied when D2D resource #m belongs to a resource having priority, and a constant number satisfying $Y_m>0$ may be applied otherwise. Meanwhile, a selection probability increases as $Z_m$ increases, $Y_m$ which is used when D2D resource #m belongs to a resource having priority may be set to be greater than $Y_m$ which is used otherwise. For example, $Y_m=0$ may be applied when D2D resource #m belongs to a resource having priority, and a constant number satisfying $Y_m<0$ may be applied otherwise.

As another example, when final metric $Z_m$ is defined as $X_m*Y_m$, and a selection probability increases as $Z_m$ decreases, $Y_m$ which is used when D2D resource #m belongs to a resource having priority may be set to be smaller than $Y_m$ which is used otherwise. For example, $Y_m=1$ may be applied when D2D resource #m belongs to a resource having priority, and a constant number satisfying $Y_m>1$ may be applied otherwise. Meanwhile, a selection probability increases as $Z_m$ increases, $Y_m$ which is used when D2D resource #m belongs to a resource having priority may be set to be greater than $Y_m$ which is used otherwise. For example, $Y_m=1$ may be input when D2D resource #m belongs to a resource having priority, and a constant number satisfying $Y_m<1$ may be input otherwise.

A representative UE of a cluster may report a resource having priority to UEs belonging to the cluster through a synchronization signal of the cluster, etc. As the same time, the representative UE may deliver information about priority in the resource, for example, information about a value to be used as the above-described correction value $Y_m$. In particular, it is possible to effectively determine a frequency in use of a resource which may be preferentially used by an adjacent cluster when D2D communication is performed by appropriately adjusting the correction value.

In other words, when a resource having priority and a resource not having priority have similar values of $Y_m$, UEs in the cluster may relatively actively use the resource not having priority. As a result, while restriction on resource selection for each cluster decreases and resource utilization for each cluster may be enhanced, interference between clusters may increase. On the other hand, when a resource having priority and a resource not having priority have greatly different values of $Y_m$, an operation may be performed to attempt to use only the resource having priority in the cluster. Even though resource utilization for each cluster may decrease, interference between clusters may be decreased.

Characteristically, when a representative UE of a cluster is a UE positioned inside a coverage area of an eNB, a certain time resource needs to be used for communication with the eNB. Thus, a resource used for D2D communication needs to be strictly restricted to a resource not used for communication with the eNB. In this case, a level of priority occupied by the cluster may be infinitely increased with respect to the resource not used for communication with the eNB, for example, an infinitely great correction value $Y_m$ may be applied to the resource not having priority when selection probability increases as final metric decreases. In this way, a control operation may be performed such that only a resource designated to be used for D2D communication by the cluster is used for D2D communication resource selection. When the fact that the representative UE of the cluster is inside the coverage area of the eNB can be reported through a synchronization signal of the cluster, infinitely great priority may be automatically assigned to a resource having priority such that a UE in the cluster selects and uses only the resource having priority.

Additionally, a UE of each cluster may deliver information about a location of a resource having priority in the cluster to which the UE belongs and priority information in the resource, for example, information about correction value $Y_m$ to UEs belonging to an adjacent cluster. A UE of the adjacent cluster receiving the information determines a final metric by applying the correction value delivered from the adjacent cluster when calculating a selection metric in each D2D resource. When a D2D resource having a small final metric is selected, the UE of each cluster may request that UEs of another cluster use relatively great correction value $Y_m$ with respect to the resource having priority in the cluster to which the UE belongs. The UEs of the other cluster apply the correction value, and thus a probability that the resource having priority will be selected from the cluster to which the UE delivering the information belongs may decrease.

Finally, a UE having D2D data to be transmitted may transmit a D2D data signal in a resource selected through the above-described process, or transmit a signal reporting that the selected resource is used in the future, that is, signal #1.

Meanwhile, the synchronization signal of the cluster described above may be effectively used as a reference of time/frequency synchronization of a discovery signal having a configuration in which a plurality of UEs in the cluster transmit signals and respective UEs receive the signals. For example, in a configuration in which a discovery signal is transmitted within a certain interval from a point in time at which a synchronization signal is transmitted as in FIG. 18, a UE transmitting the discovery signal first adjusts a transmission time point and a transmission frequency thereof based on the synchronization signal, and transmits the discovery signal. In addition, a UE receiving the discovery signal first adjusts a transmission time point and a transmission frequency thereof based on the synchronization signal, and then receives the discovery signal based on the adjusted transmission time point and transmission frequency. Through this process, even when a plurality of UEs having different oscillators transmit discovery signals at a time in a circumstance in which a reference of time/frequency synchronization cannot be obtained from an eNB, a UE may receive the discovery signals of the plurality of UEs only by being synchronized with the synchronization signal once without the need to acquire time/frequency synchronization of a separate UE.

When a great amount of resources are needed for transmission of the discovery signal, and thus the discovery signal needs to be transmitted after a period of time at which time and/or frequency synchronization acquired from the synchronization signal transmitted once is valid, the representative UE of the cluster may additionally transmit the synchronization signal in a middle of a discovery signal resource.

Figure 23:
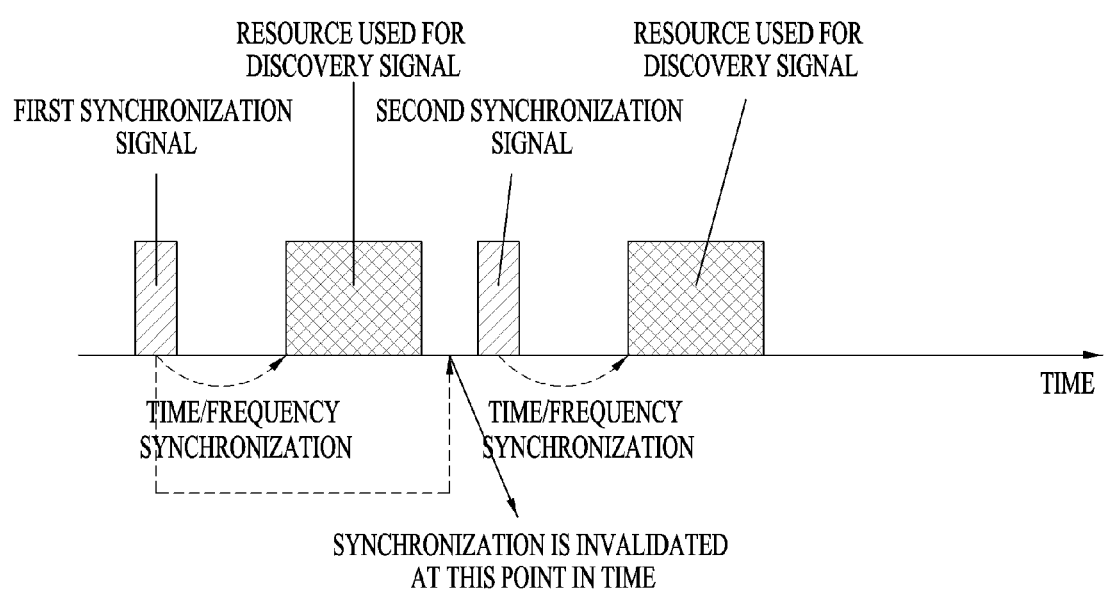
FIG. 23 is a diagram illustrating an example of additionally transmitting a synchronization signal according to an embodiment of the present invention.

FIG. 23 illustrates an example of additionally transmitting a synchronization signal according to an embodiment of the present invention.

Referring to FIG. 23, transmission of a first synchronization signal and a subsequent discovery signal resource interval are grouped. When a great number of discovery signal transmission resources are needed, grouping may be repeated several times to ensure the discovery signal transmission resources.

In this instance, repeatedly transmitted synchronization signals may be the same synchronization signal, or a sequence of the signal may be changed according to a predetermined rule. Alternatively, a first synchronization signal needs to be used when there is no synchronization, and thus may be configured to occupy more resources or provide a greater amount of synchronization information. On the other hand, subsequently repeated synchronization signals are used for partial correction in a state in which synchronization is performed to some extent based on the initial signal, and thus may be configured to occupy fewer resources or provide a smaller amount of synchronization information. Here, the synchronization signal may occupy more resources or fewer resources by setting a length of time during which the synchronization signal is transmitted or a density of the synchronization signals per unit time/frequency resource to a large value or a small value. In addition, information delivered by the initial synchronization signal may include information about the number of synchronization signals and a corresponding discovery signal resource interval.

Meanwhile, when each reception receives a signal of a single transmission UE, in particular, a D2D communication signal directly including user data, the reception UE may be synchronized with only one UE at one point in time. Therefore, instead of being synchronized with time and/or frequency of a synchronization signal transmitted by a representative UE of a cluster, a synchronization signal enabling acquisition of time/frequency synchronization may be added to a separate D2D communication signal and transmitted. Therefore, the reception UE may operate to receive a D2D communication signal after acquiring time/frequency synchronization of the transmission UE based on a synchronization signal transmitted by the transmission UE, preferably, transmitted prior to the D2D communication signal.

In this case, when time/frequency synchronization acquired from the synchronization signal of the representative UE of the cluster is within a valid time, the synchronization signal for synchronization of the transmission UE may be omitted.

Alternatively, the two synchronization signals may be used in combination. For example, an operation may be performed such that coarse frequency synchronization is performed from the synchronization signal of the representative UE of the cluster, and then a frequency offset of a small unit is estimated from the synchronization signal transmitted by the transmission UE and corrected. In this instance, from a point in time after the valid time of the synchronization signal of the representative UE of the cluster, synchronization may be performed using only the synchronization signal transmitted by the transmission UE.

Thus, the valid time of the synchronization signal of the representative UE of the cluster transmitted once may be determined in advance. Through this process, it is possible to prevent the representative UE of the cluster from frequently transmitting synchronization signals in an actual D2D communication process after a discovery process.

Meanwhile, whether a cluster head, that is, the representative UE of the cluster uses a synchronization signal may vary depending on whether a transmitted D2D signal is a discovery signal or a D2D communication signal.

Figure 24:
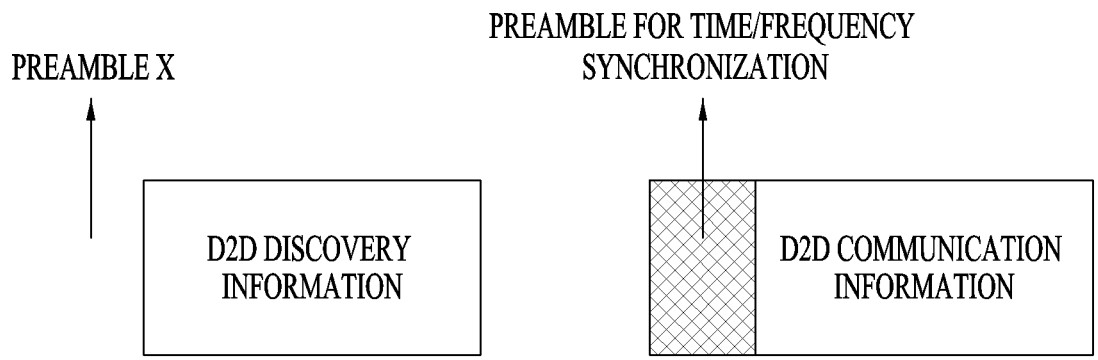
FIG. 24 is a diagram illustrating configurations of D2D signals according to an embodiment of the present invention.

FIG. 24 illustrates configurations of D2D signals according to an embodiment of the present invention.

Referring to FIG. 24, in a D2D discovery signal, a signal that carries D2D discovery information is transmitted without a separate preamble. A portion of a region carrying the D2D discovery information may include a reference signal for demodulation (for example, a demodulation reference signal (DM-RS)) for channel estimation.

In this instance, a preamble is a signal needed for synchronization before reception processing such as fast Fourier transform (FFT), and thus is transmitted prior to a signal that carries information. However, the reference signal for demodulation is a signal used for demodulation of an information signal after reception processing such as FFT, and is transmitted from a point in time at which the information signal is transmitted or thereafter. In particular, the discovery signal is mainly intended to determine whether a UE is present, and thus does not deliver a great amount of information. Therefore, when the preamble is used, a relatively great amount of overhead is occupied. In addition, the discovery signal is likely to employ a modulation scheme such as QPSK which is more robust to a frequency synchronization error. Thus, when the preamble is not used, overhead may be prevented from increasing.

On the other hand, it can be understood that a D2D communication signal of FIG. 24 transmits a preamble including a predetermined signature such that a UE may perform frequency tracking before a signal that carries D2D communication information is received. In other words, the UE acquires time/frequency synchronization based on the preamble, and performs various processes for receiving the D2D communication information based on the acquired time/frequency synchronization.

The D2D communication signal includes a relatively great amount of information, and thus the preamble occupies relatively small overhead. In addition, a modulation scheme such as quadrature amplitude modulation (QAM) which is sensitive to a frequency synchronization error is likely to be used. Thus, the above-described operation using the preamble may be effective.

Figure 25:
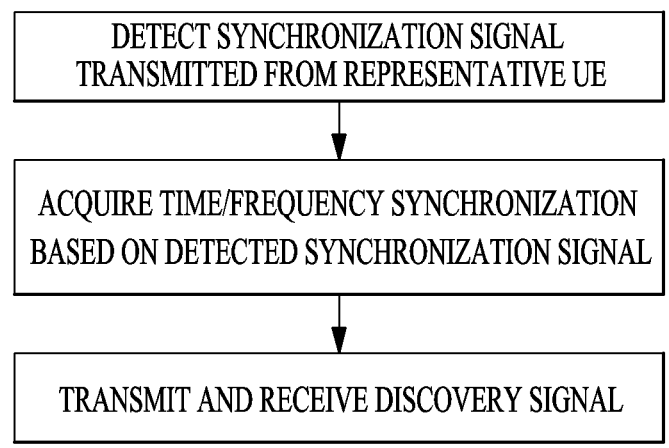
FIG. 25 is a flowchart illustrating a process of transmitting and receiving a D2D signal according to an embodiment of the present invention.

FIG. 25 illustrates a process of transmitting and receiving a D2D signal according to an embodiment of the present invention.

Referring to FIG. 25, a UE first detects a synchronization signal transmitted from a representative UE of a cluster, acquires time/frequency synchronization based on the detected synchronization signal, and then transmits and receives a discovery signal.

The scheme of mitigating the problem of interference between clusters when a D2D cluster is scheduled has been described. However, the same principle may be applied to general inter-cell interference mitigation. In this case, each D2D cluster may be regarded as a cell, and a representative UE may be regarded as a base station. In particular, the present invention may be effectively used when a connection state between base stations is poor and thus cooperation for dynamic interference adjustment is difficult.

Figure 26:
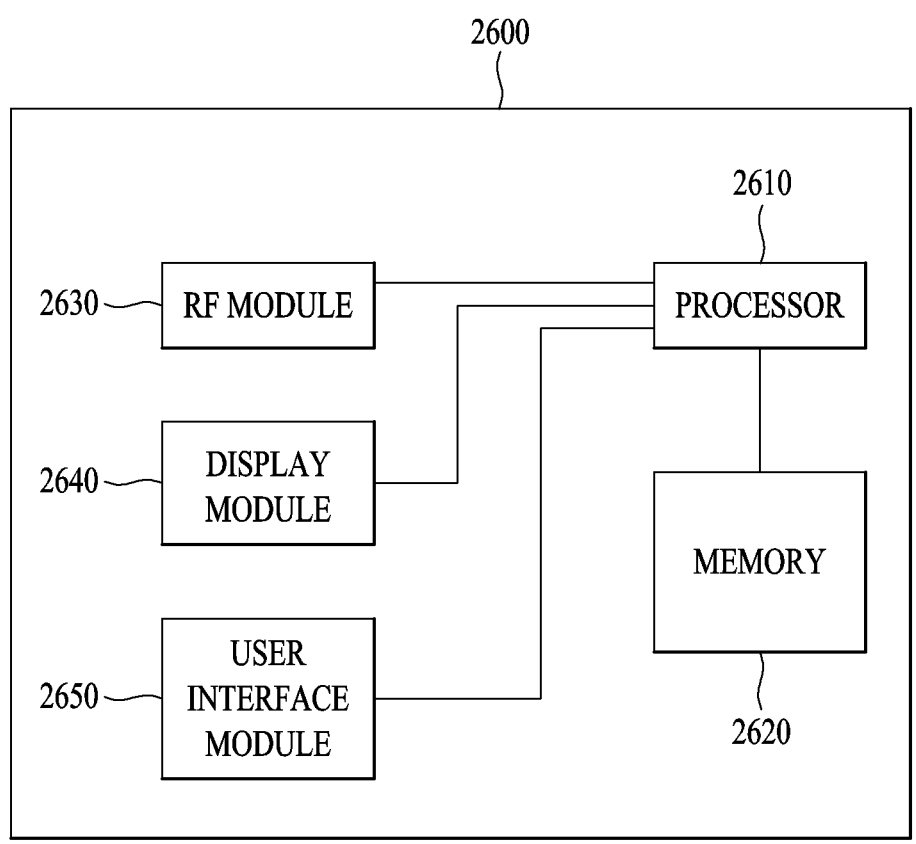
FIG. 26 is a block diagram of a communication apparatus according to an embodiment of the present invention.

FIG. 26 is a block diagram illustrating a communication apparatus in accordance with an embodiment of the present invention.

Referring to FIG. 26, a communication device 2600 includes a processor 2610, a memory 2620, a Radio Frequency (RF) module 2630, a display module 2640, and a user interface module 2650.

The communication device 2600 is illustrated for convenience of the description and some modules may be omitted. Moreover, the communication device 2600 may further include necessary modules. Some modules of the communication device 2600 may be further divided into sub-modules. The processor 2600 is configured to perform operations according to the embodiments of the present invention exemplarily described with reference to the figures. Specifically, for the detailed operations of the processor 2600, reference may be made to the contents described with reference to FIGS. 1 to 25.

The memory 2620 is connected to the processor 2610 and stores operating systems, applications, program code, data, and the like. The RF module 2630 is connected to the processor 2610 and performs a function of converting a baseband signal into a radio signal or converting a radio signal into a baseband signal. For this, the RF module 2630 performs analog conversion, amplification, filtering, and frequency upconversion or inverse processes thereof. The display module 2640 is connected to the processor 2610 and displays various types of information. The display module 2640 may include, but is not limited to, a well-known element such as a Liquid Crystal Display (LCD), a Light Emitting Diode (LED), or an Organic Light Emitting Diode (OLED). The user interface module 2650 is connected to the processor 2610 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

Even though a description has been made focusing on an example in which a method of transmitting and receiving a signal using D2D communication in the above-described wireless communication system and an apparatus for the same are applied to the 3GPP LTE system, the method and the apparatus may be applied to various other wireless communication systems.

The invention claimed is:

1. A method of receiving and transmitting synchronization signals for a device-to-device (D2D) link at a first user equipment (UE) in a wireless communication system, the method comprising:
    configuring a first time resource and a second time resource for the synchronization signals;
    receiving a first synchronization signal for the D2D link on the first time resource from a reference UE; and
    transmitting a second synchronization signal for the D2D link on the second time resource to a second UE,
    wherein, except for the first and second synchronization signals, no D2D link signal transmission from the first UE occurs in the first and second time resources.

2. The method according to claim 1, wherein the reference UE is included in an adjacent cluster different from a specific cluster comprising the first UE.

3. The method according to claim 1, wherein the first UE and the second UE are included in a same cluster.

4. The method according to claim 1, wherein each of the first time resource and the second time resource is configured periodically.

5. The method according to claim 1, wherein the first time resource is from the second time resource by a predetermined interval.

6. A first user equipment (UE) in a wireless communication system, the first UE comprising:
    a transceiver configured to transmit and receive a signal; and
    a processor connected with the transceiver and configured to process the signal,
    wherein the processor is further configured to:
        configure a first time resource and a second time resource for synchronization signals for a device-to-device (D2D) link,
        control the transceiver to receive a first synchronization signal for the D2D link on the first time resource from a reference UE, and
        control the transceiver to transmit a second synchronization signal for the D2D link on the second time resource to a second UE,
    wherein, except for the first and second synchronization signals, no D2D link signal transmission from the first UE occurs in the first and second time resources.

7. The first UE according to claim 6, wherein the reference UE is included in an adjacent cluster different from a specific cluster comprising the first UE.

8. The first UE according to claim 6, wherein the first UE and the second UE are included in a same cluster.

9. The first UE according to claim 6, wherein each of the first time resource and the second time resource is configured periodically.

10. The first UE according to claim 6, wherein the first time resource is separated from the second time resource by a predetermined interval.

* * * * *